US006813105B2

(12) United States Patent
Takano

(10) Patent No.: US 6,813,105 B2
(45) Date of Patent: Nov. 2, 2004

(54) MAGNETIC TRANSFER APPARATUS FOR TRANSFERRING DATA TO PERPENDICULAR MAGNETIC RECORDING MEDIUM AND METHOD OF MAGNETIC TRANSFER

(75) Inventor: Yukihiro Takano, Kanagawa (JP)

(73) Assignee: Fuji Electric Co., Ltd. (JP)

( * ) Notice: Subject to any disclaimer, the term of this patent is extended or adjusted under 35 U.S.C. 154(b) by 384 days.

(21) Appl. No.: 09/977,860

(22) Filed: Oct. 13, 2001

(65) Prior Publication Data

US 2002/0075582 A1 Jun. 20, 2002

(30) Foreign Application Priority Data

Oct. 13, 2000 (JP) ........................................ 2000-314390

(51) Int. Cl.[7] .............................................. G11B 5/86
(52) U.S. Cl. ............................................ 360/17; 360/16
(58) Field of Search ............................... 360/15, 16, 17

(56) References Cited

U.S. PATENT DOCUMENTS

| | | | | |
|---|---|---|---|---|
| 3,869,711 | A | | 3/1975 | Bernard et al. ................ 360/17 |
| 6,320,725 | B1 | * | 11/2001 | Payne et al. ................. 360/125 |
| 6,347,016 | B1 | * | 2/2002 | Ishida et al. ................... 360/17 |
| 6,570,724 | B1 | * | 5/2003 | Komatsu et al. .............. 360/17 |
| 6,650,497 | B1 | * | 11/2003 | Tada et al. ..................... 360/75 |
| 6,747,822 | B2 | * | 6/2004 | Saito ............................ 360/17 |

FOREIGN PATENT DOCUMENTS

| JP | 10-40544 | 2/1998 |
|---|---|---|
| JP | 11-25455 | 1/1999 |

OTHER PUBLICATIONS

R. Sugita et al.; "A Novel Magnetic Contact Duplication Technique for Servo–Writing on Magnetic Disks"; INTERMAG 2000; 2000 IEEE International Magnetics Conference; Ontario, Canada; Apr. 9–13, 2000.

R. Sugita et al.; "A Novel Magnetic Contact Duplication Technique for Servo–Writing on Magnetic Disks"; IEEE Transactions on Magnetics; vol. 36, No. 5; Sep. 2000; pp. 2285–2287.

* cited by examiner

*Primary Examiner*—David Hudspeth
*Assistant Examiner*—Daniell L. Negron
(74) *Attorney, Agent, or Firm*—Rossi & Associates

(57) ABSTRACT

A magnetic transfer apparatus includes an inexpensive and small adjusting mechanism for adjusting the positions of the magnetic heads, that facilitates preventing anomaly of drastically changing transferred signal intensity, and a very rigid mounting mechanism for mounting the magnetic heads. The magnetic transfer apparatus includes a magnetic field application means for magnetic transfer, the magnetic field application means applying a magnetic field to the master disc and the perpendicular magnetic recording medium positioned in tight contact with each other or in close proximity to each other, the magnetic field application means including a pair of magnetic heads for magnetic transfer positioned symmetrically with respect to the surface of the perpendicular magnetic recording medium facing to the master disc, the magnetic heads moving always keeping their symmetrical positional relation ship with respect to the surface of the perpendicular magnetic recording medium facing to the master disc.

28 Claims, 18 Drawing Sheets

POSITIONAL RELATIONSHIP BETWEEN
THE TRANSFERRED SIGNAL AND THE
SOFT MAGNETIC LAYER PATTERN

DISTRIBUTION OF THE PERPENDICULAR
MAGNETIC FLUX COMPONENT ON THE
MAGNETIC RECORDING MEDIUM

MAGNETIC TRANSFER APPARATUS FOR TRANSFERRING DATA TO PERPENDICULAR MAGNETIC RECORDING MEDIUM AND METHOD OF MAGNETIC TRANSFER

FIELD OF THE INVENTION

The present invention relates to an apparatus for magnetically transferring servo data for positioning the magnetic head for data recording and for data reading to a magnetic disc (magnetic recording medium) in a hard disc drive (hereinafter referred to as a "HDD"), that is typically utilized in a peripheral storage apparatus for most computers. Specifically, the present invention relates to a magnetic transfer apparatus, that uses the magnetic transfer techniques for transferring servo data to the so-called perpendicular magnetic recording media, in that the direction of the magnetization recorded therein is perpendicular to the magnetic recording media.

BACKGROUND OF THE INVENTION

The magnetic recording media used for HDD's exhibit a recording density of 20 Gbit per a square inch at the present stage of development and the recording capacity thereof is increasing at the rate of 60% a year. Since the area for recording one bit has become narrower due to the increase of the recording capacity, data recording and data reproduction by the so-called longitudinal magnetic recording method, in that the direction of the magnetization recorded is parallel to the surface (longitudinal direction) of the magnetic recording medium, has become more difficult. To obviate this problem, a so-called perpendicular recording medium, in that the direction of the magnetization recorded is perpendicular to the magnetic recording medium, has been proposed. The perpendicular magnetic recording medium includes a magnetic recording layer of a hard magnetic material and a lining layer of a soft magnetic material for localizing the magnetic fluxes generated by the magnetic head used for recording data in the recording layer.

In the usual HDD's, data is recorded and reproduced by a magnetic head mounted on a floating mechanism called slider, that keeps the magnetic head floating several tens of nanometers above a circular magnetic recording medium rotating. The bit data on the magnetic recording medium is stored in data tracks arranged concentrically on the magnetic recording medium. To record and reproduce data, the magnetic head for data recording and for data reproduction is moved quickly toward an aimed data track and positioned above the aimed data track. Servo data including tracking signals for detecting a relative position of the magnetic head and the data track, address signals and reproducing clock signals are stored on the recording plane of the magnetic recording medium. The servo data corresponding to one data track is stored on the same circle of the data track at a predetermined period of angles. As shown in FIG. 17, the servo data is stored in servo data regions, shaped with stripes (or fans) and formed at a predetermined period of angles, and along the data tracks. The servo data is recorded by an exclusive apparatus called servo track writer to a magnetic recording medium mounted on a HDD, so that the centers of the regions storing the signals indicative of the servo data may not deviate from the center of the magnetic recording medium nor from the center of the trajectory of the magnetic head for data recording and for data reproduction.

As described earlier, the recording density of the servo data is inevitably rising with increasing recording density of the magnetic recording medium. Due to the high recording density of the magnetic recording medium, the time necessary to write the servo data with a high density is prolonged, the manufacturing efficiencies of the HDD's are lowered and the manufacturing costs are increased.

Recently, an alternative method has been proposed to obviate the problems of the conventional method, which writes the servo data from a magnetic head of the data track writer for writing the signals indicative of the servo data in the data tracks track by track. The alternative method shortens the time necessary to record the servo data on magnetic recording media by transferring the servo data stored on a master disc to the magnetic recording media recording medium by recording medium by the magnetic transfer techniques.

Japanese Unexamined Laid Open Patent Application H10-40544 discloses a method of transferring servo data to a longitudinal magnetic recording medium from a master disc including convex portions and ferromagnetic concave portions. This publication, however, describes nothing on the magnetic transfer method for perpendicular magnetic recording media. Japanese Unexamined Laid Open Patent Application H11-25455 discloses a scheme that uses a master disc including a groove formed thereon for air feeding and for air sucking to ensure tight contact of the master disc with a magnetic recording medium. This publication, however, describes nothing on the magnetic transfer method for perpendicular magnetic recording media.

FIG. 1(a) is a schematic drawing describing initialization of a longitudinal magnetic recording medium. FIG. 1(b) is a schematic drawing describing magnetic transfer to the longitudinal magnetic recording medium. Referring now to FIG. 1(a), the initialization of the longitudinal magnetic recording medium is an operation that magnetizes the magnetic layer of a magnetic recording medium 1 in a certain direction parallel to the magnetic recording medium by a leakage magnetic field 4 leaking from a gap 3 of a ring head 2. Referring now to FIG. 1(b), the magnetic transfer is an operation, that applies a magnetic field 7, opposite to the leakage magnetic field 4 used in the initialization operation, from a gap 6 of a ring head 5 to the magnetic recording medium 1 in tight contact with a master disc for magnetic transfer 8 (hereinafter referred to simply as a "master disc"). Since the leakage magnetic field 7 converges to soft magnetic layers 9 with a high magnetic permeability, the strength of the leakage magnetic field 7 applied to the magnetic recording medium 1 decreases in the portions facing to the soft magnetic layers 9 of the master disc 8. The strength of the leakage magnetic field 7 applied to the magnetic recording medium 1 does not decrease in the portions not facing to the soft magnetic layers 9. Therefore, only the portions of the magnetic recording medium 1 not facing to any soft magnetic layer 9 are magnetized by the leakage magnetic field 7. Thus, servo signals are transferred. As described above, the initialization operation or the transfer operation is conducted by positioning a ring head above one surface of a magnetic recording medium.

FIG. 2(a) is a schematic drawing describing initialization of a perpendicular magnetic recording medium, the magnetization direction thereof is perpendicular thereto. FIG. 2(b) is a schematic drawing describing magnetic transfer onto the perpendicular magnetic recording medium. Referring now to FIG. 2(a), a perpendicular magnetic recording medium 11 is initialized by a perpendicular magnetic field 14 applied thereto from two permanent magnets of single pole type 12 and 12 (hereinafter referred to as "single-pole magnetic heads") such that the magnetization directs to a direction perpendicular to the perpendicular magnetic recording medium 11. Referring now to FIG. 2(b), a perpendicular magnetic field 15, the direction thereof is opposite to that of the perpendicular magnetic field 14 used for initialization, is applied to the perpendicular magnetic recording medium 11 in tight contact with a master disc 8. The perpendicular magnetic field 15 converges to soft magnetic layers 9, the magnetic permeability thereof is high. The strength of the perpendicular magnetic field 15 increases in the portions of the perpendicular magnetic recording medium 11 facing to the soft magnetic layers 9 embedded in the master disc 8. The strength of the perpendicular magnetic field 15 decreases in the portions of the perpendicular magnetic recording medium 11 not facing to any soft magnetic layer 9. Therefore, the perpendicular magnetic field 15 is effective only beneath the soft magnetic layers 9 for magnetically transferring of the servo signals. In the way different from the magnetic transfer to the longitudinal magnetic recording medium, the magnetic transfer to the perpendicular magnetic recording medium is conducted with two single-pole magnetic heads 12, 12 or 13, 13 facing opposite to each other across the perpendicular magnetic recording medium 11.

The conventional magnetic transfer apparatus, that conducts magnetic transfer to the perpendicular magnetic recording medium, poses several problems. First, the magnetic field distribution in the magnetic transfer described with reference to FIG. 2(b) is explained. In the initialization described in FIG. 2(a) and the magnetic transfer in FIG. 2(b), two single-pole magnetic heads are arranged such that a pole of a first polarity of one of the magnetic heads is facing to a pole of a second polarity of the other magnetic head (1) to narrow the expansion of the magnetic field in the longitudinal directions and (2) to apply only the perpendicular component of the magnetic field to the perpendicular magnetic recording medium. FIG. 4 is a schematic drawing describing a model of the magnetic field applied by two single-pole magnetic heads 13 and 13. To simplify the model, it is assumed that only parallel components 21 and 22 exist on both sides of one of the single-pole magnetic heads 13 and only a perpendicular component 23 in the central area below the one of the single-pole magnetic heads 13. It is also assumed that only parallel components 24 and 25 exist on both sides of the other one of the single-pole magnetic heads 13 and only a perpendicular component 26 in the central area above the other one of the single-pole magnetic heads 13. As the model described in FIG. 4 indicates, the single-pole magnetic heads 13 and 13 positioned facing to each other are more effective to converge the perpendicular components 23 and 26 and to prevent the parallel components 21, 22, 24 and 25 from extending as compared with using one single-pole magnetic head (e.g. one of the single-pole magnetic heads 13 only). When the single-pole magnetic heads 13 and 13 are aligned at the same orientation in perpendicular to the perpendicular magnetic recording medium 11 and spaced apart from the perpendicular magnetic recording medium 11 for the same distance (hereinafter, the above described arrangement of the magnetic heads will be referred to as the symmetrical positional relationship between (of) the magnetic heads"), only the perpendicular components of the magnetic fields are applied to the perpendicular magnetic recording medium and the parallel components 21, 22 of the magnetic field applied by the one of the single-pole magnetic head 13 and the parallel components 24, 25 of the magnetic field applied by the other one of the single-pole magnetic head 13 compensate each other.

As described above, only the perpendicular components of the magnetic fields are effective for magnetic transfer to the perpendicular magnetic recording medium. Therefore, it is necessary not only for the physical shapes of the single-pole magnetic heads to be the same but also for the positional relationship between the magnetic heads to be symmetric with respect to the surface of the perpendicular magnetic recording medium.

Note that two single-pole magnetic heads are facing to each other in such an orientation that a pole of a first polarity of one of the magnetic heads is facing to a pole of a second polarity of the other magnetic head. Since the single-pole magnetic heads are spaced apart from the surface of the perpendicular magnetic recording medium for 0.5 mm at the shortest, the single-pole magnetic heads are spaced apart from each other for several mm. Since the single-pole magnetic heads exhibiting the magnetic force of the order of $10^{-1}$ T (several thousands Gauss) or more are used in the conventional magnetic transfer apparatus, a stronger magnetic field may be used in the future. Therefore, a strong attractive force is generated between the single-pole magnetic heads. The strong attractive force causes a heavy load on the mounts of the magnetic heads. As described above, it is necessary to position the magnetic heads symmetrically with respect to the surface of the perpendicular magnetic recording medium. It is difficult and impractical to adjust the positions of the single-pole magnetic heads as described above depending solely on the mechanical precision of the single-pole magnetic heads. To obviate this problem, it is necessary to mount the single-pole magnetic heads on the magnetic transfer apparatus via an adjusting stage for adjusting the positions of the single-pole magnetic heads at least in one direction. However, the adjusting stage, that endures the heavy load described above, is inevitably large and such a large adjusting stage is impractical. Such a large adjusting stage is impractical also from the view point of costs. In view of the foregoing, it would be desirable to provide a magnetic transfer apparatus that meets the requirements of the rigidity of the mount of the single-pole magnetic head and includes a small adjusting stage for adjusting the positions of the single-pole magnetic heads.

For conducting a practical magnetic transfer operation, the perpendicular magnetic recording medium is attached to and detached from magnetic transfer apparatus. During the attaching and the detaching of the perpendicular magnetic recording medium, it is necessary to withdraw the magnetic heads from the perpendicular magnetic recording medium. It is necessary for the magnetic transfer apparatus to have a structure that facilitates moving the magnetic heads while keeping their symmetrical positional relationship during the removal thereof.

FIGS. 6(a) and 6(b) show the servo signals, that do not meet the transfer conditions described above. As described above, it is necessary to raise and lower the magnetic heads in the directions 10 shown in FIGS. 2(a) and 2(b) once for every turn of the magnetic recording medium to withdraw the magnetic heads from the perpendicular magnetic recording medium during the initialization and the magnetic transfer. In detail, FIG. 6(a) is a chart describing the waveform of the servo signal transferred by single-pole magnetic heads moved without their symmetrical positional relationship maintained during the magnetic transfer. FIG. 6(b) is a chart describing the wave form of a servo signal transferred, by single-pole magnetic heads moved with their symmetrical positional relationship maintained during the magnetic transfer, to the perpendicular magnetic recording medium initialized with the single-pole magnetic heads moved without their symmetrical positional relationship maintained during the initialization. When the magnetic heads for magnetic transfer are not moved symmetrically, an anomaly 34, that is a drastic change in the transferred signal intensity, is caused as shown in FIG. 6(a) once for every rotation cycle of the recording medium at the position of the recording medium, at that the magnetic heads for magnetic transfer are raised and lowered. Referring now to FIG. 6(b), an anomaly 35, that is a drastic change in the transferred signal intensity, is caused once for every rotation cycle of the recording medium at the position of the recording medium, at that the magnetic heads for magnetic transfer are raised and lowered. As the waveforms described in FIGS. 6(a) and 6(b) indicate, it is important to move the magnetic heads with their symmetrical positional relationship always maintained.

In view of the foregoing, it would further be desirable to provide a magnetic transfer apparatus for perpendicular magnetic recording media, and a method of magnetic transfer, that facilitates positioning magnetic heads symmetrically and moving the magnetic heads with their symmetrical positional relationship always maintained.

SUMMARY OF THE INVENTION

According to a first aspect of the invention, there is provided a magnetic transfer apparatus, the magnetic transfer apparatus magnetically transferring servo data carried by a master disc to a perpendicular magnetic recording medium including a substrate and a magnetic recording layer on the substrate, the magnetic transfer apparatus including: a positioning means, the positioning means positioning the master disc in close proximity to or in tight contact with the perpendicular magnetic recording medium; an adjusting means, the adjusting means adjusting the positions of the master disc and the perpendicular magnetic recording medium; a first magnetic field application means, the first magnetic field application means applying a magnetic field for magnetically transferring to the master disc and the perpendicular magnetic recording medium positioned in close proximity to each other or in tight contact with each other; the first magnetic field application means including a pair of magnetic transfer heads arranged symmetrically with respect to the surface of the perpendicular magnetic recording medium facing to the master disc; and the magnetic transfer heads moving symmetrically with respect to the surface of the perpendicular magnetic recording medium facing to the master disc.

Advantageously, the magnetic transfer apparatus further includes a second magnetic field application means, the second magnetic field application means applying to the perpendicular magnetic recording medium a magnetic field for initializing the magnetization over the entire perpendicular magnetic recording medium; the second magnetic field application means including a pair of magnetic initializing heads arranged symmetrically with respect to the surface of the perpendicular magnetic recording medium, that will be facing to the master disc; and the magnetic initializing heads moving symmetrically with respect to the surface of the perpendicular magnetic recording medium, that will be facing to the master disc.

According to a second aspect of the invention there is provided a magnetic transfer apparatus, the magnetic transfer apparatus magnetically transferring servo data carried by a master disc to a perpendicular magnetic recording medium including a substrate and two magnetic recording layers on the major surfaces of the substrate, the magnetic transfer apparatus including: a positioning means, the positioning means positioning the master disc in close proximity to or in tight contact with the perpendicular magnetic recording medium; an adjusting means, the adjusting means adjusting the positions of the master disc and the perpendicular magnetic recording medium; a first magnetic field application means, the first magnetic field application means applying a magnetic field for magnetically transferring to the master disc and the perpendicular magnetic recording medium positioned in close proximity to each other or in tight contact with each other; the first magnetic field application means including a pair of magnetic transfer heads arranged symmetrically with respect to the center plane between the major surfaces of the perpendicular magnetic recording medium; and the magnetic transfer heads moving symmetrically with respect to the center plane between the major surfaces of the perpendicular magnetic recording medium.

Advantageously, the magnetic transfer apparatus further includes a second magnetic field application means, the second magnetic field application means applying to the perpendicular magnetic recording medium a magnetic field for initializing the magnetization over the entire perpendicular magnetic recording medium; the second magnetic field application means including a pair of magnetic initializing heads arranged symmetrically with respect to the center plane between the major surfaces of the perpendicular magnetic recording medium; and the magnetic initializing heads moving symmetrically with respect to the center plane between the major surfaces of the perpendicular magnetic recording medium.

Advantageously, the first magnetic field application means includes a horizontal linear stage moving horizontally; two vertical linear stages moving vertically; two links connecting the horizontal linear stage and the vertical linear stages; the magnetic transfer heads being mounted on the respective vertical linear stages; and an actuator, the actuator driving the horizontal linear stage to move the magnetic transfer heads always symmetrically.

Advantageously, the first magnetic field application means includes a driving shaft; a pinion on the drive shaft; two racks coupled to the pinion, the racks being moved by the rotation of the pinion to the respective directions opposite to each other; two vertical linear stages fixed to the respective racks, the vertical linear stages moving vertically; the magnetic transfer heads being mounted on the respective vertical linear stages; and the driving shaft rotating to move the magnetic heads vertically and always symmetrically.

Advantageously, the first magnetic field application means includes a first linear stage; a second linear stage; the first linear stage and the second linear stage moving always symmetrically the magnetic transfer heads; the first linear stage including an adjusting stage mounting one of the magnetic transfer heads thereon, and a fixing means; the other one of the magnetic transfer heads being mounted on the second linear stage; the one of the magnetic transfer heads being released from the fixing thereof to the first linear stage to adjust the positions of the magnetic transfer heads; and the fixing means fixing the one of the magnetic transfer heads to the first linear stage to apply a magnetic field to the perpendicular magnetic recording medium.

Advantageously, the first magnetic field application means and the second magnetic field application means has the same structure.

Advantageously, each of the magnetic transfer heads is a single-pole magnetic head.

Advantageously, each of the magnetic transfer heads is a ring head.

Advantageously, each of the magnetic initializing heads is a single-pole magnetic head.

Advantageously, the master disc includes a nonmagnetic substrate including soft magnetic layers, the soft magnetic layers being arranged in stripe-shaped ranges patterned or embedded in the surface portion of the nonmagnetic substrate corresponding to the servo data.

According to a third aspect of the invention, there is provided a method of magnetically transferring servo data carried by a master disc to a perpendicular magnetic recording medium including a substrate and a magnetic recording layer on one of the major surfaces of the substrate, the method including the steps of: positioning the master disc in close proximity to or in tight contact with the perpendicular magnetic recording medium; positioning a pair of magnetic transfer heads in a symmetrical positional relationship with respect to the surface of the perpendicular magnetic recording medium facing to the master disc; making the magnetic transfer heads come close to the perpendicular magnetic recording medium while keeping the symmetrical positional relationship with respect to the surface of the perpendicular magnetic recording medium facing to the master disc; applying a magnetic field to the perpendicular magnetic recording medium from the magnetic transfer heads to transfer the servo data from the master disc to the perpendicular magnetic recording medium; and withdrawing the magnetic transfer heads from the perpendicular magnetic recording medium while keeping the symmetrical positional relationship with respect to the surface of the perpendicular magnetic recording medium facing to the master disc.

Advantageously, the method further includes the steps of: positioning a pair of magnetic initializing heads the perpendicular magnetic recording medium in a symmetrical positional relationship with respect to the surface of the perpendicular magnetic recording medium, that will be facing to the master disc; making the magnetic initializing heads come close to the perpendicular magnetic recording medium while keeping the symmetrical positional relationship with respect to the surface of the perpendicular magnetic recording medium, that will facing to the master disc; applying a magnetic field to the perpendicular magnetic recording medium from the magnetic initializing heads to initialize the perpendicular magnetic recording medium; and withdrawing the magnetic initializing heads from the perpendicular magnetic recording medium while keeping the symmetrical positional relationship with respect to the surface of the perpendicular magnetic recording medium, that will be facing to the master disc.

According to a fourth aspect of the invention, there is provides a method of magnetically transferring servo data carried by a master disc to a perpendicular magnetic recording medium including a substrate and two magnetic recording layer on both major surfaces of the substrate, the method including the steps of: positioning the master disc in close proximity to or in tight contact with the perpendicular magnetic recording medium; positioning a pair of magnetic transfer heads in a symmetrical positional relationship with respect to the center plane between the major surfaces of the perpendicular magnetic recording medium; making the magnetic transfer heads come close to the perpendicular magnetic recording medium while keeping the symmetrical positional relationship with respect to the center plane between the major surfaces of the perpendicular magnetic recording medium; applying a magnetic field to the perpendicular magnetic recording medium from the magnetic transfer heads to transfer the servo data from the master disc to the perpendicular magnetic recording medium; and withdrawing the magnetic transfer heads from the perpendicular magnetic recording medium while keeping the symmetrical positional relationship with respect to the center plane between the major surfaces of the perpendicular magnetic recording medium.

Advantageously, the method further includes the steps of: positioning a pair of magnetic initializing heads the perpendicular magnetic recording medium in a symmetrical positional relationship with respect to the center plane between the major surfaces of the perpendicular magnetic recording medium; making the magnetic initializing heads come close to the perpendicular magnetic recording medium while keeping the symmetrical positional relationship with respect to the center plane between the major surfaces of the perpendicular magnetic recording medium; applying a magnetic field to the perpendicular magnetic recording medium from the magnetic initializing heads to initialize the perpendicular magnetic recording medium; and withdrawing the magnetic initializing heads from the perpendicular magnetic recording medium while keeping the symmetrical positional relationship with respect to the center plane between the major surfaces of the perpendicular magnetic recording medium.

Advantageously, the pair of the magnetic transfer heads is a pair of single-pole magnetic heads, a pole of a first polarity of one of the single-pole magnetic heads facing to a pole of a second polarity of the other one of the single-pole magnetic heads.

Advantageously, the pair of the magnetic transfer heads is a pair of ring heads, the poles of the same polarity of the ring heads facing to each other.

BRIEF DESCRIPTION OF THE DRAWING FIGURES

The invention will be described with reference to certain preferred embodiments and the accompanying drawings, wherein.

DETAILED DESCRIPTION OF THE PREFERRED EMBODIMENTS

Figure 15:
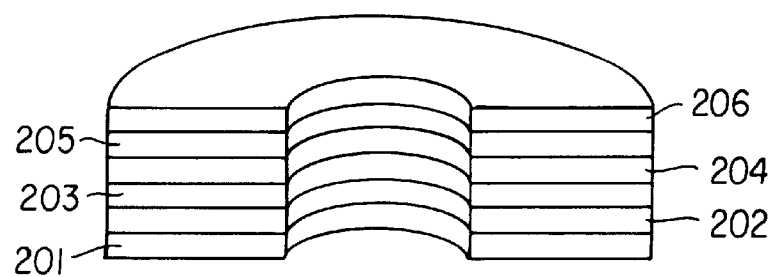
FIG. 15 is a perspective cross sectional view of a typical perpendicular magnetic recording medium.

FIG. 15 is a perspective cross sectional view of a typical perpendicular magnetic recording medium. Referring now to FIG. 15, the perpendicular magnetic recording medium according to the invention includes a nonmagnetic substrate 201, a soft magnetic layer 202, and a magnetic recording layer 204. If necessary, a protection layer 205, a liquid lubricant layer 206 or both are formed on the magnetic recording layer 204. Although these layers are formed on one side of the substrate 201 in FIG. 15, these layers may be formed on both sides of the substrate 201.

A circular Al alloy plate (a circular disc having a circular hole bored in the central part thereof) plated with a NiP layer, a circular tempered glass plate or a circular crystallized glass plate usually used in the longitudinal magnetic recording media may be used for the nonmagnetic substrate 201. Although a NiFe alloy or a Sendust (FeSiAl) alloy may be used for the soft magnetic layer 202, amorphous Co alloys are preferable for the soft magnetic layer 202. The Co alloys are synthesized by adding Zr, Nb, Ta, Hf, Ti or W alone or an appropriate combination of these metals to Co. A ferromagnetic material containing at least Co and Cr is used for the magnetic recording layer 204 preferably. In using a ferromagnetic material for a perpendicular magnetic recording medium, it is necessary to orient the c-axis of the close packed hexagonal structure of the ferromagnetic material in perpendicular to the recording plane of the perpendicular magnetic recording medium, that is to orient the easy axis of magnetization of the ferromagnetic material in perpendicular to the recording plane of the perpendicular magnetic recording medium. It is important for the coercive force of the material of the magnetic recording layer 204 in the perpendicular direction to be much higher than that in the longitudinal direction of the magnetic recording medium. Preferably, an undercoating layer 203 of a Ti alloy or a TiCr alloy is interposed between the soft magnetic layer 202 and the magnetic recording layer 204 to control the crystal orientation and the crystal size of the magnetic recording layer 204. A thin film containing carbon as its main component is used for the protection layer 205. A lubricant of perfluoropolyether family is used for the lubricant layer 206.

Figure 16:
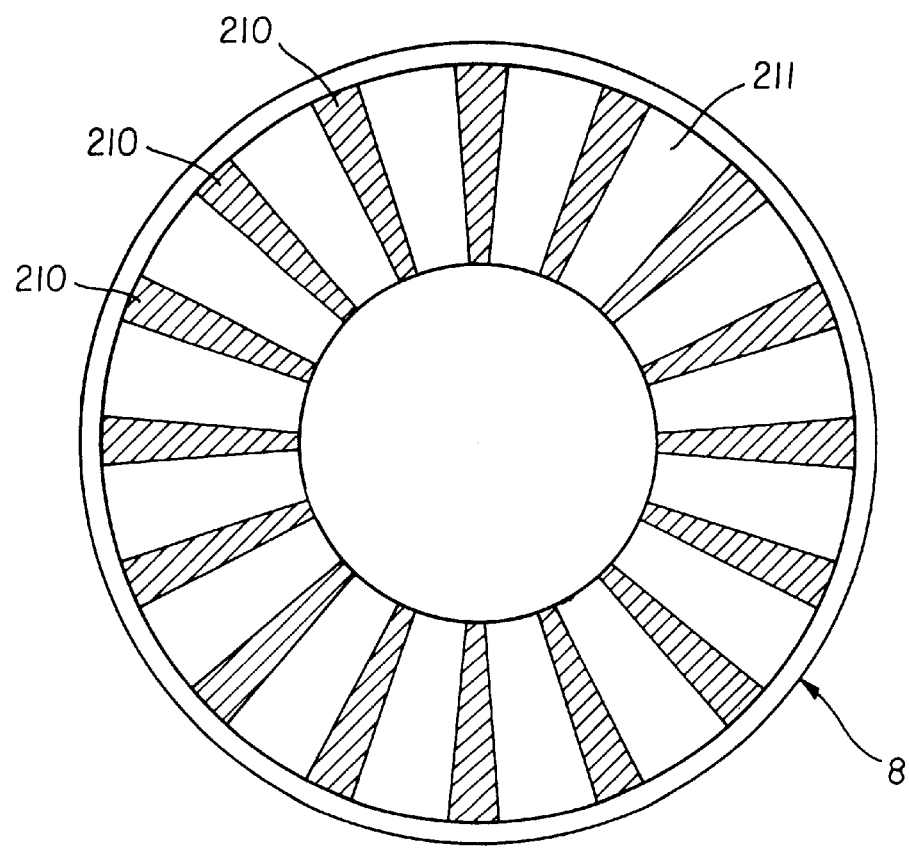
FIG. 16 is a top plan view of a master disc used for magnetic transfer according to the invention.

A master disc 8 as shown in FIG. 16 and as used for the conventional longitudinal magnetic recording medium is used for the magnetic transfer of the perpendicular magnetic recording medium according to the invention. The master disc 8 includes a nonmagnetic substrate 211 and soft magnetic material layers (soft magnetic layers 9) isolated from each other and embedded in stripe-shaped (fun-shaped) periodical regions 210 formed on or in the surface portion of the nonmagnetic substrate 211. The soft magnetic layers 9 are shaped with patterns corresponding to the servo data.

The patterns corresponding to the servo data are patterns, with that the servo data is transferred to a magnetic recording medium when magnetic transfer is conducted on the magnetic recording medium. The patterns are different depending on the specifications of the HDD. The patterns as used for the conventional longitudinal magnetic recording medium may be used for the perpendicular magnetic recording medium. Usually, the patterns are formed in the stripe-shaped regions 210 extending in the radial direction of the master disc 8 and formed periodically at every predetermined degrees of angle.

The nonmagnetic substrate 211 for the master disc is made of a glass, silicon or a resin, although it depends on the method of forming the patterns of the soft magnetic layers. The nonmagnetic substrate 211 having an area corresponding to the area of the perpendicular magnetic recording medium 11, to that the servo data is transferred, may be used. Preferably, the shape and the area of the nonmagnetic substrate 211 are the same with those of the perpendicular magnetic recording medium 11. Although it depends on the manufacturing conditions such as the perpendicular magnetic recording medium 11 used and the strength of the magnetic field, the nonmagnetic substrate 211 is preferably from 0.2 to 0.5 mm in thickness.

Preferably, the magnetic permeability of the soft magnetic layers 9 is greatly different from the magnetic permeability in the longitudinal direction of the magnetic recording layer of the perpendicular magnetic recording medium. Preferably, the relative magnetic permeability of the soft magnetic layer is 100 or more. The material that exhibits such a high magnetic permeability facilitates converging the magnetic field applied by the magnetic heads for magnetic transfer in the perpendicular direction and conducting efficient magnetic transfer. Preferably, the soft magnetic layers 9 are made of pure Co. Although the soft magnetic layers 9 are preferably thick for magnetic flux localization, the soft magnetic layer 9 are preferably thin for recording the servo data with a high density. Therefore, there exists an optimum thickness for the soft magnetic layers 9. The soft magnetic layers 9 are preferably from 200 to 500 nm, more preferably from 250 to 350 nm, and the most preferably 300 nm in thickness. The soft magnetic layers 9 of the master disc 8 are formed on the nonmagnetic substrate 211 or in the surface portions of the nonmagnetic substrate 211. For forming the soft magnetic layers 9 on the nonmagnetic substrate 211, patterned soft magnetic layers are deposited on the nonmagnetic substrate 211. For forming the soft magnetic layers 9 in the surface portions of the nonmagnetic substrate 211, concave portions shaped with desired patterns are arranged on the nonmagnetic substrate 211 and soft magnetic layers 9 are buried in the concave portions.

Figure 1A:
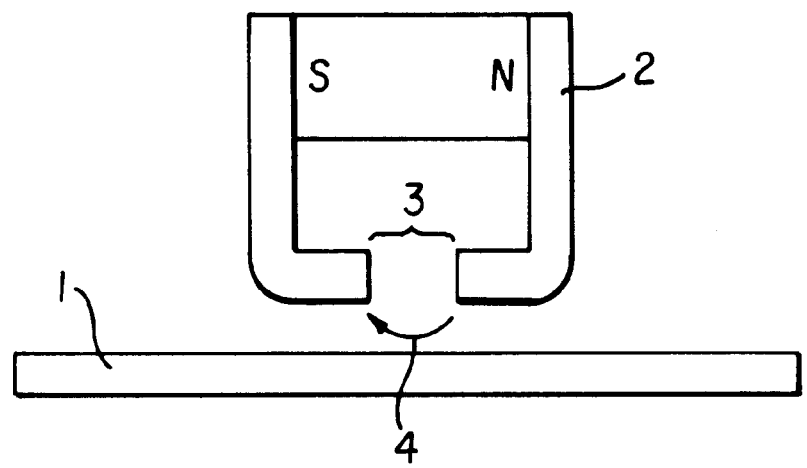
FIG. 1(a) is a schematic drawing describing initialization of a longitudinal magnetic recording medium.
Figure 1B:
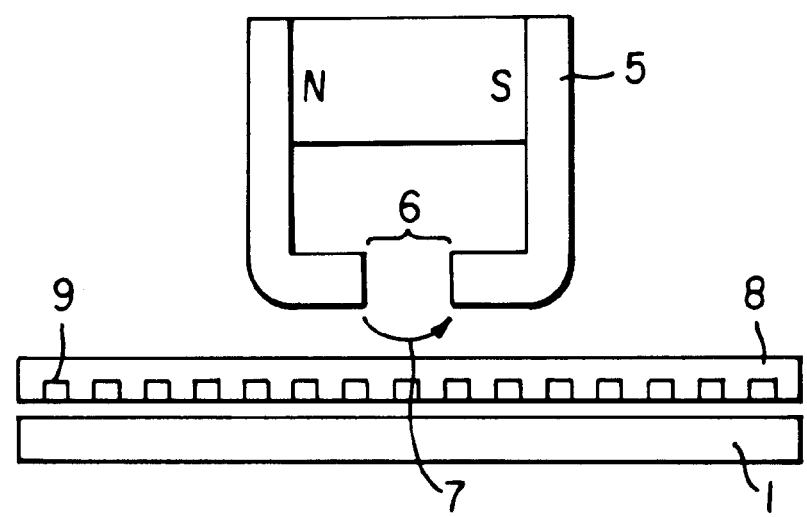
FIG. 1(b) is a schematic drawing describing magnetic transfer onto the longitudinal magnetic recording medium.
Figure 2A:
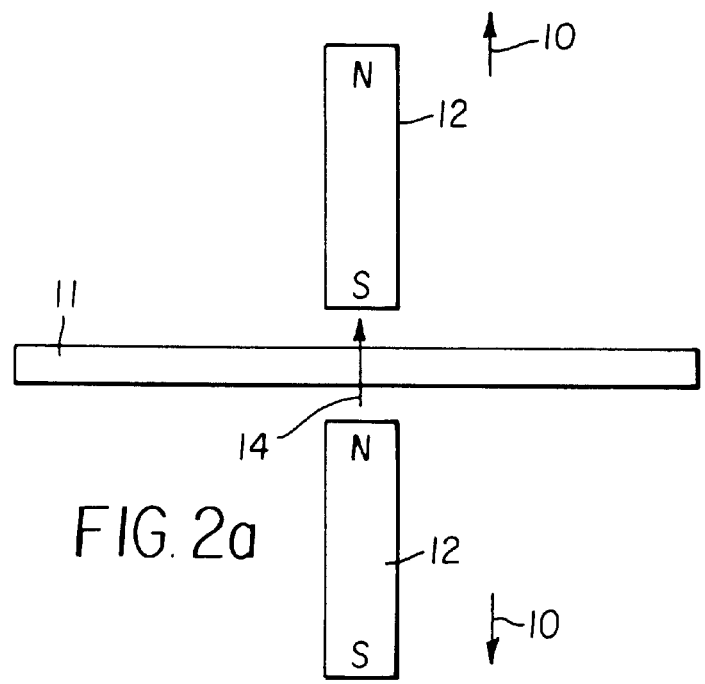
FIG. 2(a) is a schematic drawing describing a conventional initialization process for initializing a perpendicular magnetic recording medium.
Figure 2B:
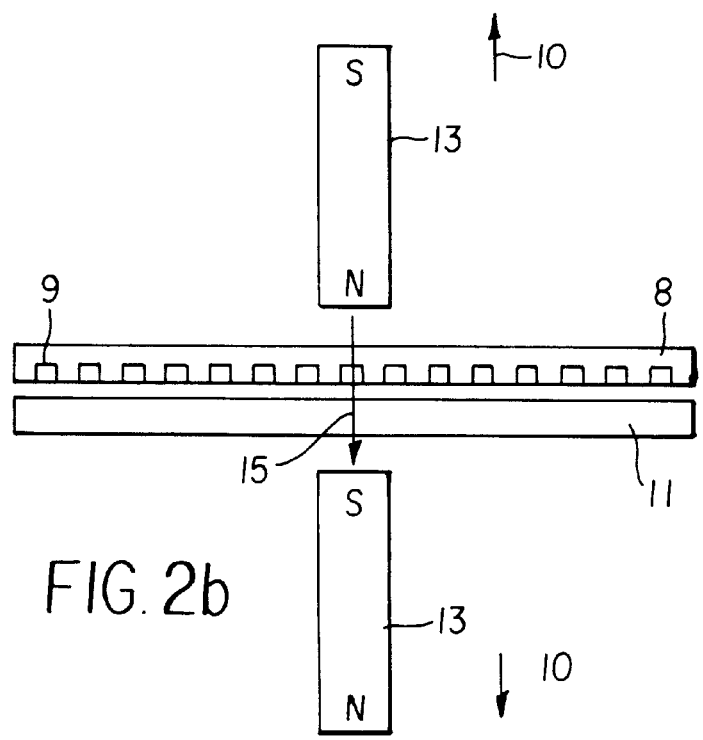
FIG. 2(b) is a schematic drawing describing a conventional process of magnetic transfer onto the perpendicular magnetic recording medium.

Since initialization according to the invention is conducted with two single-pole magnetic heads facing to each other in the same way as described earlier with reference to FIG. 2(*a*), the initialization according to the invention will not be described in detailed to avoid duplicated explanations. The initialization is conducted using two single-pole magnetic heads facing to each other in the same way as the magnetic transfer except that any master disc is not used and the magnetic field applied for initialization is opposite to the magnetic field applied for magnetic transfer.

Magnetic transfer is conducted by positioning a master disc 8 in tight contact with or in close proximity to a perpendicular magnetic recording medium 11 and by applying a perpendicular magnetic field from single-pole magnetic heads facing opposite to each other. The magnetic transfer may be conducted also by applying a parallel magnetic field from ring heads. The surface of the master disc 8 facing to the perpendicular magnetic recording medium 11 includes soft magnetic layers 9 carrying the servo data. When the master disc 8 is positioned in close proximity to the perpendicular magnetic recording medium 11, the master disc 8 and the perpendicular magnetic recording medium 11 is spaced apart for 1 mm or shorter.

Figure 17:
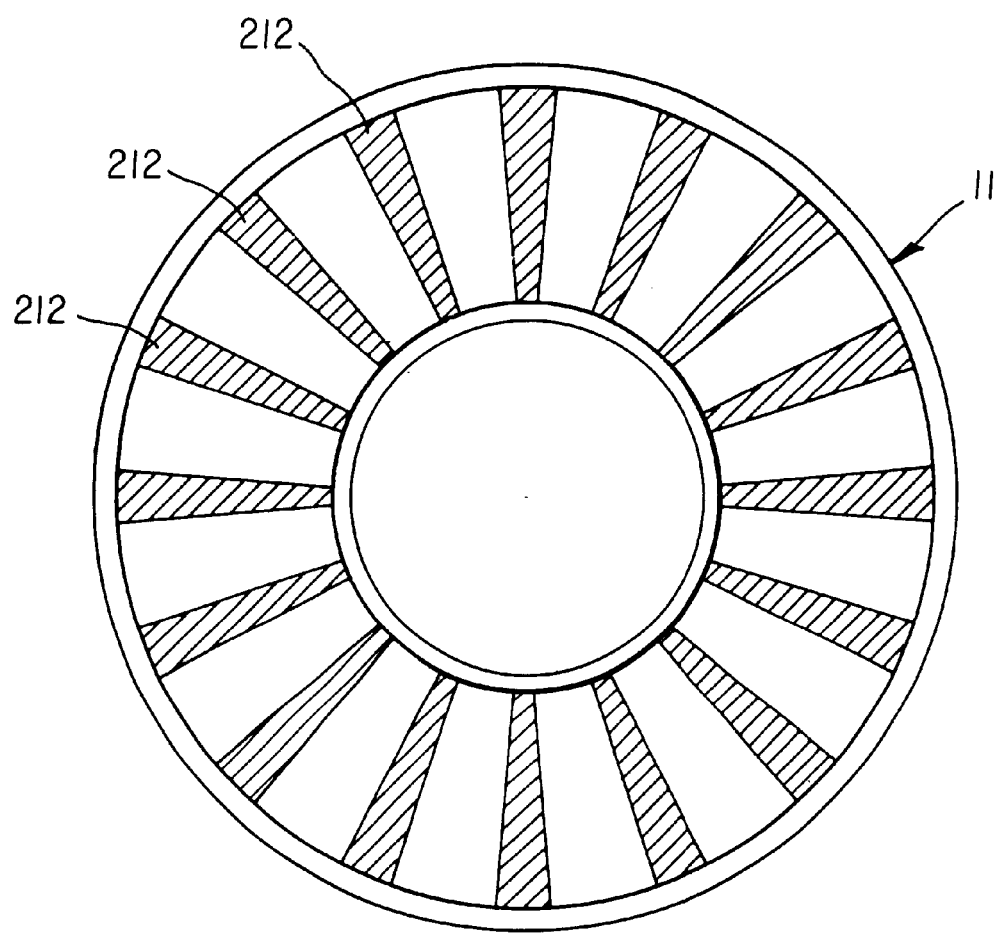
FIG. 17 is a top plan view of a perpendicular magnetic recording medium manufactured by the magnetic transfer method according to the invention.

By the magnetic transfer operation described in detail below, the servo data on the master disc is transferred to a perpendicular magnetic recording medium. The servo data transferred to the perpendicular magnetic recording medium from the master disc is recorded, as illustrated in FIG. 17, in stripe-shaped regions 212 extending in the radial direction of the perpendicular magnetic recording medium 11. Preferably, the regions 212 are arranged periodically at every predetermined angles of degree.

A transfer operation by a perpendicular magnetic field is conducted by using single-pole magnetic heads arranged symmetrically with respect to the surface (having a magnetic recording layer thereon) of the perpendicular magnetic recording medium or with respect to the center plane between the major surfaces (having magnetic recording layers thereon) of the perpendicular magnetic recording medium and by moving the magnetic heads to the portions of the perpendicular magnetic recording medium, therein the servo data is to be recorded. In detail, the transfer operation is conducted by rotating the magnetic recording medium or by moving the single-pole magnetic heads in the circumferential direction of the magnetic recording medium and by applying a perpendicular magnetic field from the single-pole magnetic heads.

The single-pole magnetic heads 13 generate a magnetic field in perpendicular to the perpendicular magnetic recording medium 11. Although it depends on the coercive force and the magnetic permeability (both in the perpendicular direction and the longitudinal direction) of the magnetic recording layer of the perpendicular magnetic recording medium 11, the permeability of the master disc, the shape of the magnetic heads 13 and such factors, the magnetic field strength is preferably from 0.4 to 1 T.

It is necessary to optimize the spacing between the surface of the perpendicular magnetic recording medium 11 facing to the master disc 8 and the single-pole magnetic heads 13 (in the case, therein the magnetic transfer is conducted on one of the major surfaces of the magnetic recording medium 11) or the spacing between the center plane between the major surfaces of the perpendicular magnetic recording medium 11 and the single-pole magnetic heads 13 (in the case, therein the magnetic transfer is conducted on the major surfaces of the magnetic recording medium 11) considering the strength of the magnetic field generated by the single-pole magnetic heads 13, the shape of the soft magnetic layers 9 of the master disc 8, the material of the soft magnetic layers 9, and the magnetic characteristics of the perpendicular magnetic recording medium 11. The preferable spacing is from 1 to 4 mm.

For intensifying the strength of the magnetic field in the perpendicular direction contributing to recording the transferred signals, it is necessary for the magnetic flux density to be large in the soft magnetic layers 9. As the magnetic flux density in the soft magnetic layers 9 increases, the magnetic field in the portions of the magnetic recording layer beneath the soft magnetic layers 9 becomes higher and the higher magnetic field in the magnetic recording layer facilitates writing the transferred signals more clearly.

When a perpendicular magnetic field is applied to the perpendicular magnetic recording medium 11, the magnetic fluxes converge to the portions of the magnetic recording medium 11 facing to the soft magnetic layers 9 and a leakage magnetic field is caused in the portions of the magnetic recording medium 11 not facing to any soft magnetic layer 9. Therefore, the strength of the magnetic field applied to the perpendicular magnetic recording medium 11 changes periodically in one direction. In other words, the magnetic transfer is conducted not depending simply on the strength of the perpendicular magnetic field localized to the soft magnetic layers 9 but utilizing the difference between the strength of the magnetic field in the portions of the magnetic recording medium 11 facing to the soft magnetic layers 9 and strength of the magnetic field in the portions of the magnetic recording medium 11 not facing to any soft magnetic layer 9. Therefore, it is necessary for the coercive force Hc in the direction perpendicular to the magnetic recording layer of the perpendicular magnetic recording medium 11 to be higher than the strength of the magnetic field in the portions thereof not facing to any soft magnetic layer 9 and to be lower than the strength of the magnetic field in the portions thereof facing to the soft magnetic layers 9.

The transfer operation by a parallel magnetic field is conducted by using ring heads arranged symmetrically with respect to the surface (having a magnetic recording layer thereon) of the perpendicular magnetic recording medium or with respect to the center plane between the major surfaces (having magnetic recording layers thereon) of the perpendicular magnetic recording medium and by moving the ring heads to the portions of the perpendicular magnetic recording medium, therein the servo data is to be recorded. In detail, the transfer operation is conducted by rotating the magnetic recording medium or by moving the ring heads in the circumferential direction of the magnetic recording medium and by applying a parallel magnetic field from the ring heads.

Figure 3A:
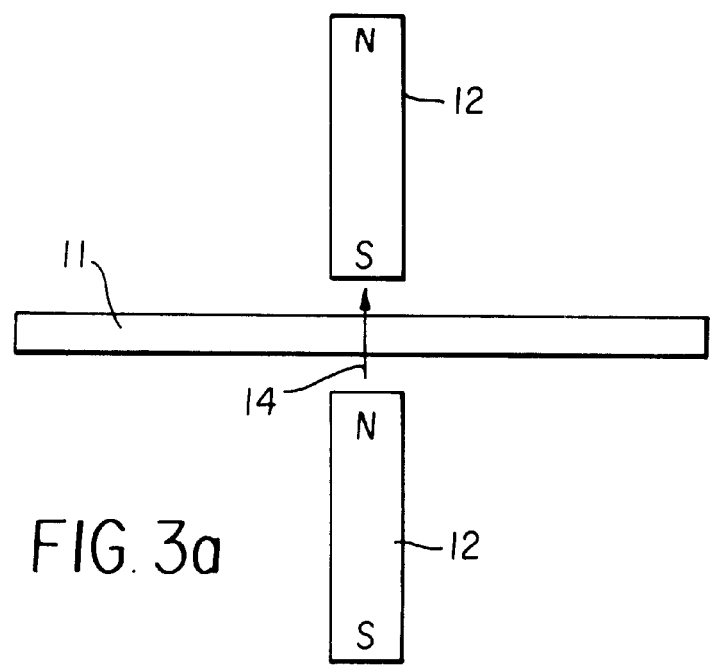
FIG. 3(a) is a schematic drawing describing another conventional initialization process for initializing a perpendicular magnetic recording medium.
Figure 3B:
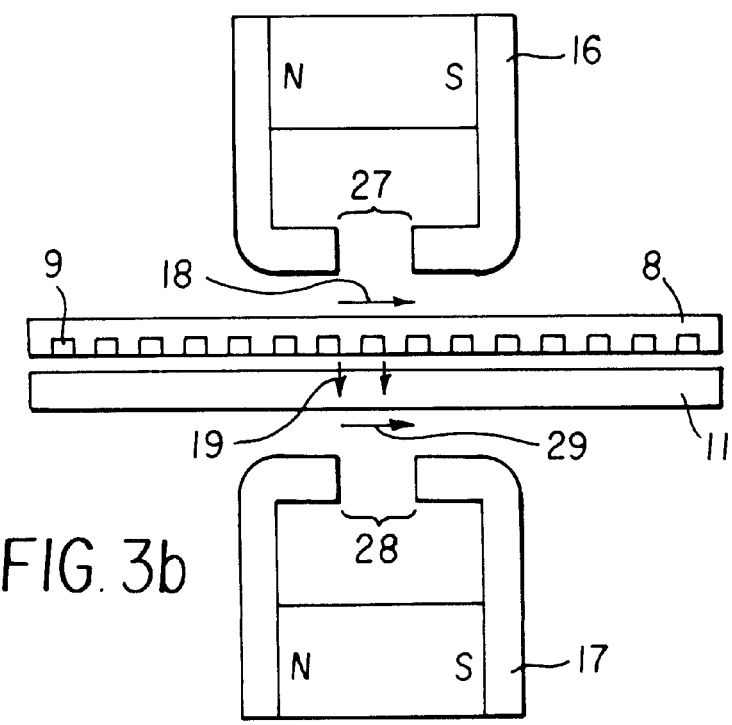
FIG. 3(b) is a schematic drawing describing another conventional process of magnetic transfer onto a perpendicular magnetic recording medium.
Figure 4:
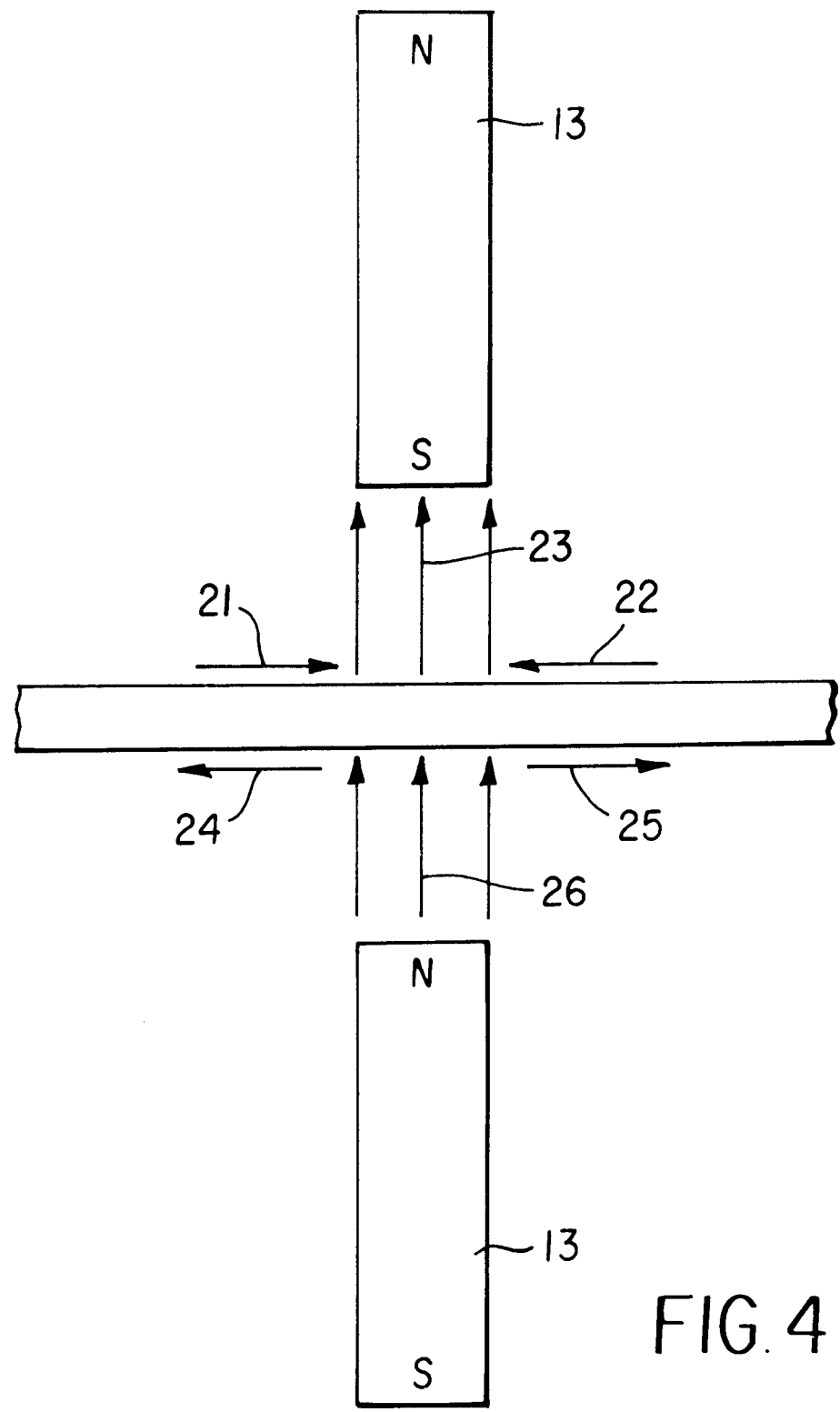
FIG. 4 is a schematic drawing describing a model of the magnetic field applied by two single-pole magnetic heads.

Now the magnetic transfer using a parallel magnetic field will be described in detail with reference to FIG. 3(b). In the magnetic transfer process according to the invention, ring heads 16 and 17, each including a permanent magnet and yokes attached to both poles of the permanent magnet as shown in FIG. 3(b), are used. A gap 27 or 28 is formed between the tips of the yokes. The ring heads are oriented such that the gaps 27 and 28 are facing to the master disc. Parallel magnetic fields 18 and 29, due to the leakage magnetic fields from the gaps 27 and 28 and parallel to the major surfaces of the perpendicular magnetic recording medium 11, are applied to the perpendicular magnetic recording medium 11.

Although it depends on the master disc 8 and the perpendicular magnetic recording medium 11, the gaps 27 and 28 of the ring heads are preferably from 3 to 6 mm in width. Although the ring heads, each including a permanent magnet, are described in FIG. 3(b), the permanent magnet may be replaced by a solenoid coil having appropriate dimensions and such a means well known to those skilled in the art. In the magnetic transfer process according to the invention, the magnetic heads (ring heads) generate a magnetic field in parallel to (in the longitudinal direction of) the perpendicular magnetic recording medium 11. Although it depends on the coercive force and the permeability (both in the perpendicular direction and in the parallel direction) of the magnetic recording layer of the perpendicular magnetic recording medium 11, the permeability of the soft magnetic layers 9, the shapes of the ring heads 16 and 17, and such factors, the strength of the magnetic field 18 is preferably from 0.4 to 1 T.

A pair of ring heads 16 and 17 are positioned with respect to the perpendicular magnetic recording medium 11 in the same manner as the single-pole magnetic heads 13 and 13. Note that the ring heads 16 and 17 are arranged as shown in FIG. 3(b) in such an orientation that generates a unidirectional parallel magnetic field.

It is necessary to optimize the spacing between the surface of the perpendicular magnetic recording medium 11 facing to the master disc 8 and the gaps 27, 28 of the ring heads (in the case, therein the magnetic transfer is conducted on one of the major surfaces of the magnetic recording medium 11) or the spacing between the center plane between the major surfaces of the perpendicular magnetic recording medium 11 and the gaps 27, 28 of the ring heads (in the case, therein the magnetic transfer is conducted on the major surfaces of the magnetic recording medium 11) considering the strength of the magnetic field generated by the ring heads 16, 17, the shape of the soft magnetic layers 9 of the master disc 8, the material of the soft magnetic layers 9, and the magnetic characteristics of the perpendicular magnetic recording medium 11. The preferable spacing is from 1 to 4 mm.

In the magnetic transfer according to the invention, the ring heads 16 and 17 are moved in the same way as the single-pole magnetic heads 13. The ring heads 16 and 17 are moved from the side of the N pole to the side of the S pole or vise versa.

Figure 18A:
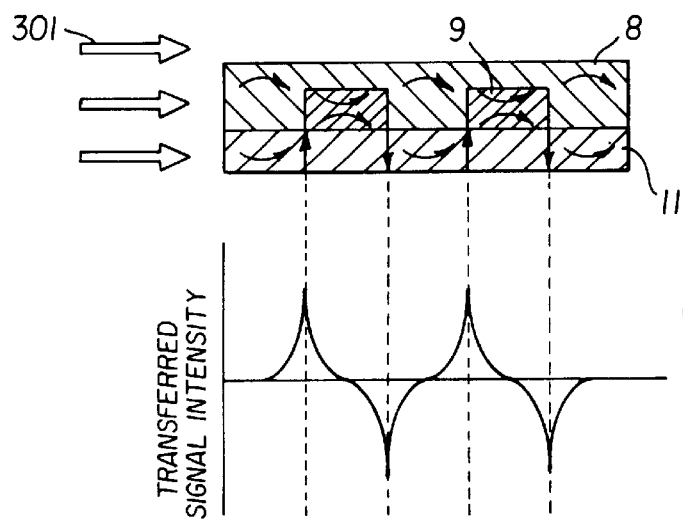
FIG. 18(A) shows the positional relation between the transfer signals and the soft magnetic layers.
Figure 18B:
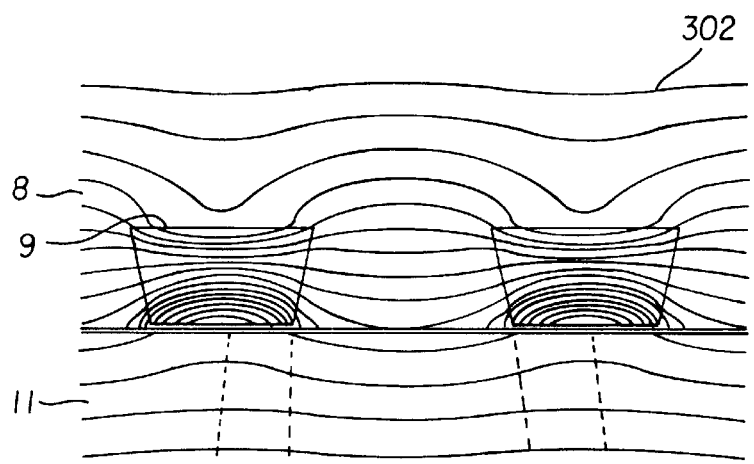
FIG. 18(B) shows the magnetic lines of force in the perpendicular magnetic recording medium and the master disc.
Figure 18C:
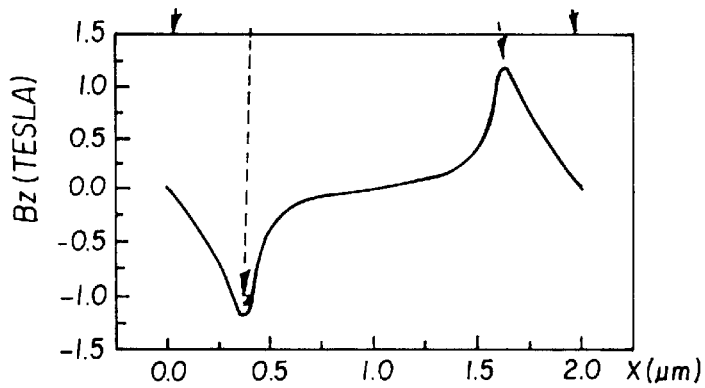
FIG. 18(C) is a graph showing the distribution of perpendicular components of the magnetic fluxes on the surface of the perpendicular magnetic recording medium.

The mechanism of the magnetic transfer to the perpendicular magnetic recording medium using a parallel magnetic field will now be described with reference to FIGS. 18(A) through 18(C). FIG. 18(A) shows the positional relationship between the transfer signals and a magnetic field 301 applied by the ring heads 16 and 17 in parallel to the perpendicular magnetic recording medium 11 and the master disc 8. FIG. 18(B) shows magnetic lines of force 302 of the parallel magnetic field. FIG. 18(C) is a graph showing the distribution of the perpendicular components of the magnetic field applied in parallel to the perpendicular magnetic recording medium. The magnetic field applied to the vicinity of the soft magnetic layers 9 converges to the soft magnetic layers 9, the magnetic permeability thereof is high. The magnetic field applied to the vicinity of the soft magnetic layers 9 causes a leakage magnetic field in the regions, therein any soft magnetic layer does not exist. Since the magnetic field converging to the soft magnetic layers 9 and the leakage magnetic field have perpendicular components, a perpendicular magnetic field is generated. The strength of the perpendicular magnetic field has peaks at both ends of the pattern of the soft magnetic layer. The directions of the peaks at both ends of the pattern of the soft magnetic layer are opposite to each other. If the perpendicular magnetic recording medium 11 was uniformly magnetized upward in the figure by initialization, the magnetization in the right end portion of the soft magnetic layer is inverted by the magnetic transfer, that is the signal is transferred, since a perpendicular component of the magnetic fields pointing downward is generated in the right end portion of the soft magnetic layer. The magnetization in the left end portion of the soft magnetic layer, to that the magnetic field pointing downward is applied, is not inverted. In other words, the magnetization in the left end portion of the soft magnetic layer keeps the initialized direction and, therefore, any signal is not transferred to the left end portion of the soft magnetic layer.

Note that the direction of the perpendicular component of the magnetic field generated at the right end of the soft magnetic layer by the parallel magnetic field applied to the soft magnetic layers 9 is opposite to the direction of the perpendicular component of the magnetic field generated at the left end of the soft magnetic layer. Therefore, it is possible to invert the direction of the initial magnetization (that is, it is possible to transfer a signal corresponding to the soft magnetic layer) as far as the strength of the perpendicular component of the magnetic field generated by applying a parallel magnetic field is higher than the coercive force of the perpendicular magnetic recording medium 11. In other words, the magnetic transfer is facilitated not by the difference of the magnetic field strength between the portions facing to the soft magnetic layers 9 and the portions not facing to any soft magnetic layer but simply by the strength of the perpendicular component of the magnetic field generated. The mechanism described above facilitates avoiding the limitations posed on the magnetic recording layer of the perpendicular magnetic recording medium 11 for conducting magnetic transfer by applying a perpendicular magnetic field and expanding the range of selecting materials for the magnetic recording layer.

Figure 5:
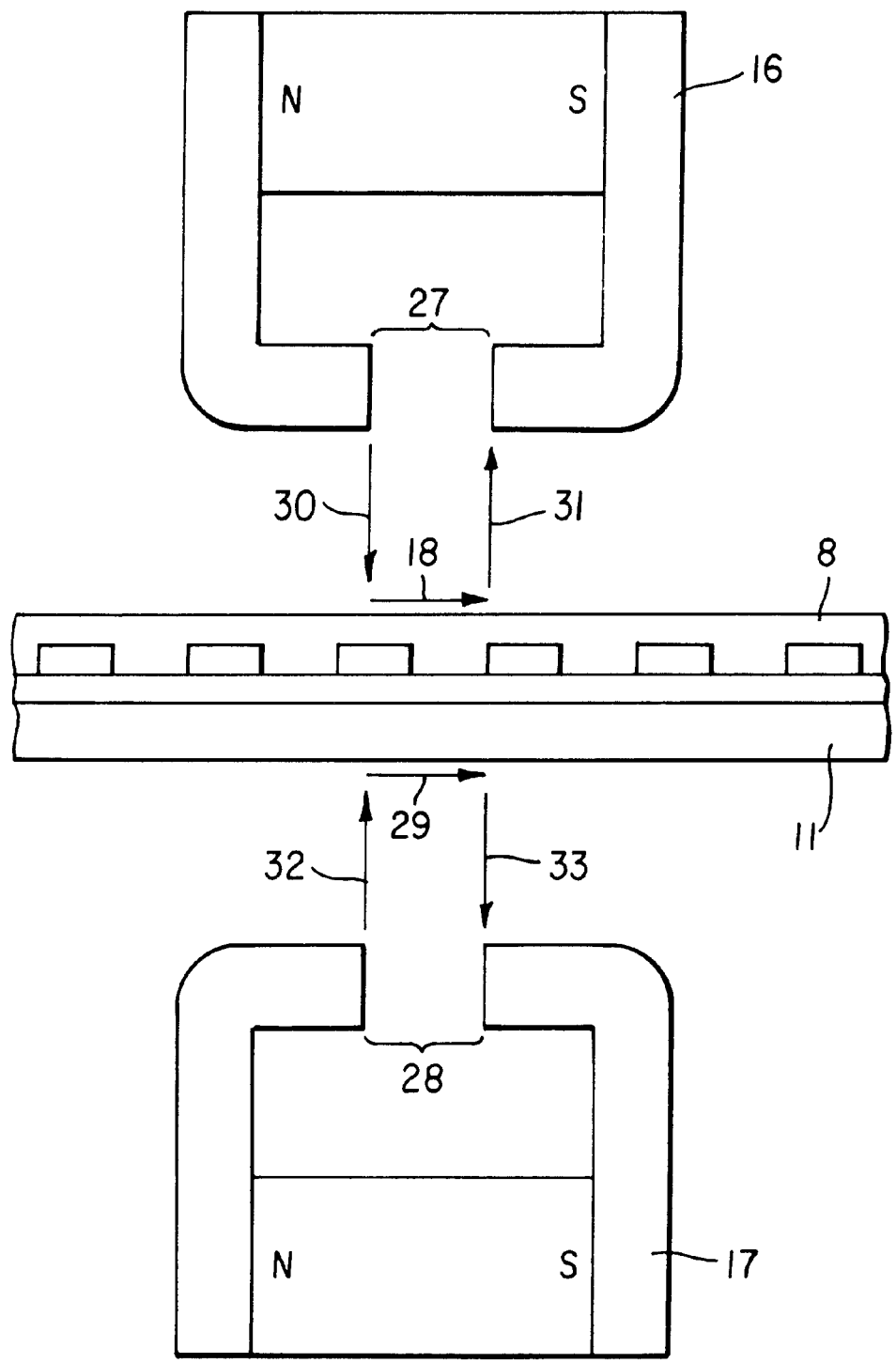
FIG. 5 is a schematic drawing describing a model of the magnetic fields applied by two ring heads.
Figure 6A:
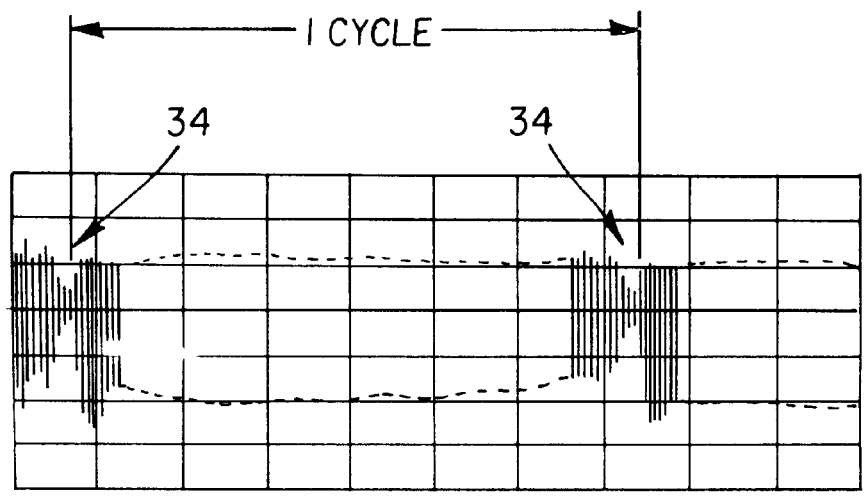
FIG. 6(a) is a chart describing the waveform of the servo signal transferred to a perpendicular magnetic recording medium by the single-pole magnetic heads moved without their symmetrical positional relationship maintained during the magnetic transfer.
Figure 6B:
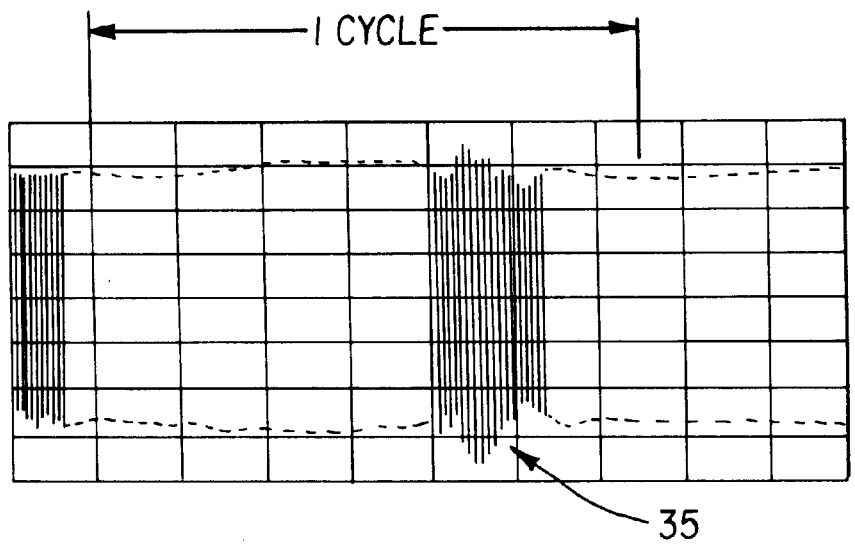
FIG. 6(b) is a chart describing the wave form of the servo signal transferred, by single-pole magnetic heads moved with their symmetrical positional relationship always maintained during the magnetic transfer, to the perpendicular magnetic recording medium, initialized with single-pole magnetic heads moved without their symmetrical positional relationship maintained during the initialization.

As described above, only the parallel component of the magnetic field applied to the perpendicular magnetic recording medium 11, more in detail only the perpendicular magnetic field generated by the parallel component, is effective for the magnetic transfer. Therefore, it is important in applying the parallel magnetic field not only for the polarity of the magnetic field that the ring heads 16 and 17 generate but also for the strength distribution of the magnetic field to be symmetric with respect to the surface of the perpendicular magnetic recording medium 11 facing to the master disc 8 (in the case, therein the magnetic transfer is conducted on one of the major surfaces of the magnetic recording medium 11) or with respect to the center plane between the major surfaces of the perpendicular magnetic recording medium 11 (in the case, therein the magnetic transfer is conducted on the major surfaces of the magnetic recording medium 11). As shown in FIG. 5, the magnetic field generated by a ring head has a perpendicular component as well as parallel components. In FIG. 5, a magnetic field (indicated by arrows 30, 18 and 31) from the gap 27 of the ring head 16 and a magnetic field (indicated by arrows 32, 29 and 33) from the gap 28 of the ring head 17 are shown in a simplified fashion. The perpendicular magnetic field (indicated by the arrows 30, 31, 32 and 33) caused by the ring heads may invert the direction of the magnetization in the perpendicular magnetic recording medium and, therefore, may erase the transferred signals. Alternatively, the perpendicular magnetic field may transfer signals to the portions, therein the signals are not to be recorded. By arranging the ring heads 16 and 17 symmetrically as shown in FIG. 3(b), the perpendicular components of the magnetic field may be canceled in the vicinity of the surface of the perpendicular magnetic recording medium 11 or in the vicinity of the surface of the master disc 8, thereon the soft magnetic layers 9 are formed. Therefore, the magnetic field is applied in parallel to the surface of the perpendicular magnetic recording medium 11 facing to the master disc 8 by the ring heads arranged symmetrically with respect to the surface of the perpendicular magnetic recording medium 11 facing to the master disc 8 as shown in FIG. 3(b).

As described above, it is necessary to arrange the ring heads 16 and 17 symmetrically in the transfer operation that applies parallel magnetic fields. It is necessary to use an adjusting stage for adjusting the positions of the ring heads 16 and 17. Since the poles of the same polarity are facing to each other in contrast to the magnetic transfer that employs perpendicular magnetic fields, a large repulsive force is caused between the ring heads 16 and 17. Therefore, it is necessary to employ a structure that includes an adjusting stage and mounts for the ring heads rigid enough to sustain the tolerable load of the adjusting stage.

Therefore, it is necessary to employ a structure for the magnetic transfer by means of parallel magnetic fields that facilitates arranging the magnetic heads symmetrically and moving the magnetic heads with their symmetrical positional relationship kept during the movement.

A magnetic transfer apparatus according to the invention for conducting the foregoing initialization operation and for conducting the foregoing transfer operation will now be described below. The magnetic transfer apparatus according to the invention has the following specific features:

(1) the magnetic transfer apparatus according to the invention facilitates arranging magnetic heads symmetrically with respect to the surface of the perpendicular magnetic recording medium 11 facing to the master disc 8 (in the case, therein the magnetic transfer is conducted on one of the major surfaces of the magnetic recording medium 11) or with respect to the center plane between the major surfaces of the perpendicular magnetic recording medium 11 (in the case, therein the magnetic transfer is conducted on the major surfaces of the magnetic recording medium 11);

(2) during moving the magnetic heads, the magnetic transfer apparatus according to the invention facilitates maintaining the symmetrical positional relationship between the magnetic heads with respect to the surface of the perpendicular magnetic recording medium 11 facing to the master disc 8 (in the case, therein the magnetic transfer is conducted on one of the major surfaces of the magnetic recording medium 11) or with respect to the center plane between the major surfaces of the perpendicular magnetic recording medium 11 (in the case, therein the magnetic transfer is conducted on the major surfaces of the magnetic recording medium 11);

(3) the magnetic transfer apparatus according to the invention facilitates moving the magnetic heads for adjusting the positions thereof to the area almost unaffected by the magnetic force and detaching the magnetic heads from a vertical linear stage;

(4) the magnetic transfer apparatus according to the invention facilitates fixing the magnetic heads and the vertical linear stage;

(5) the magnetic transfer apparatus according to the invention having the functions as described above facilitates adjusting the positions of the magnetic heads and maintaining the rigidity of the mount of the magnetic heads; and (6) the magnetic transfer apparatus according to the invention facilitates reducing the size and manufacturing costs thereof.

The magnetic transfer apparatus according to the invention will be described in detail below in connection with the preferred embodiments thereof.

The magnetic transfer apparatus for perpendicular magnetic recording medium according to the embodiments of the invention will be described with reference to FIGS. 7(a) through 14(c).

Figure 7A:
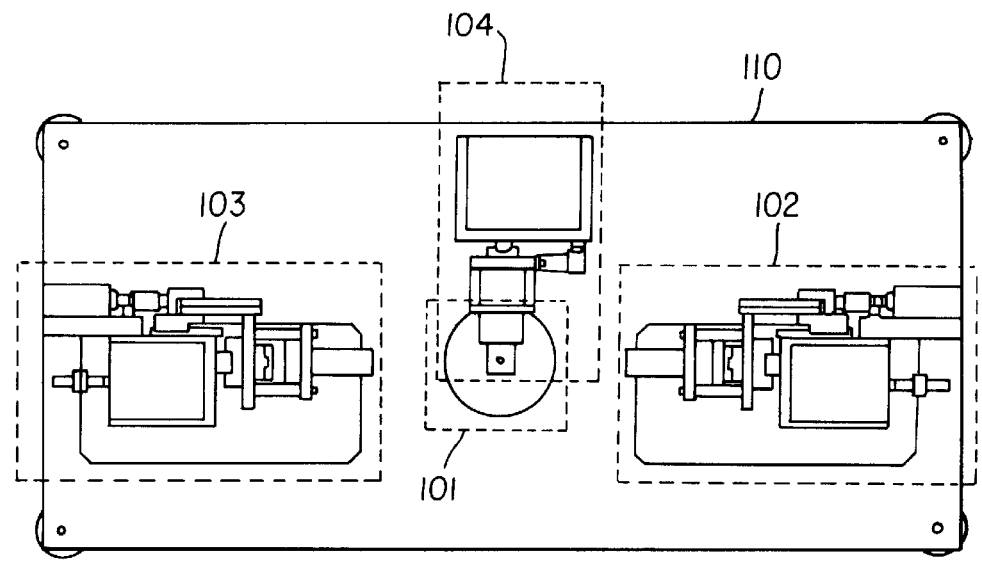
FIG. 7(a) is a top plan view of a magnetic transfer apparatus according to a first embodiment of the invention.
Figure 7B:
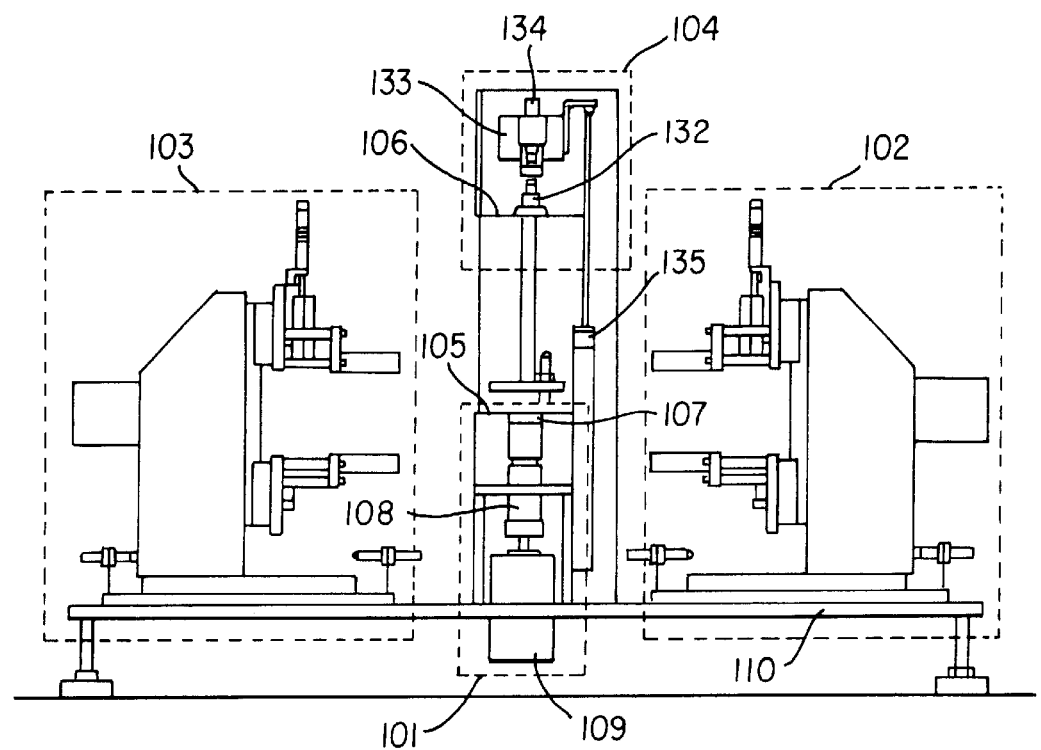
FIG. 7(b) is a side plan view of the magnetic transfer apparatus according to the first embodiment of the invention.

FIG. 7(a) is a top plan view of a magnetic transfer apparatus according to a first embodiment of the invention, and FIG. 7(b) is a side plan view of the magnetic transfer apparatus according to the first embodiment of the invention. The magnetic transfer apparatus according to the first embodiment includes four blocks 101, 102, 103, and 104. These blocks are arranged on a base 110 as shown in the figures to conduct a series of transfer operations.

Block 101 is a supporting block for supporting a perpendicular magnetic recording medium. The supporting block 101 includes an air chuck 107 for holding a perpendicular magnetic recording medium 105, to that servo data will be transferred, and for contacting the recording medium 105 tightly with a master disc 106; a spindle 108 for holding the recording medium 105 and master disc 106 and for rotating the recording medium 105 and master disc 106 during the transfer operation; and a driving motor 109 for driving the spindle.

Figure 8A:
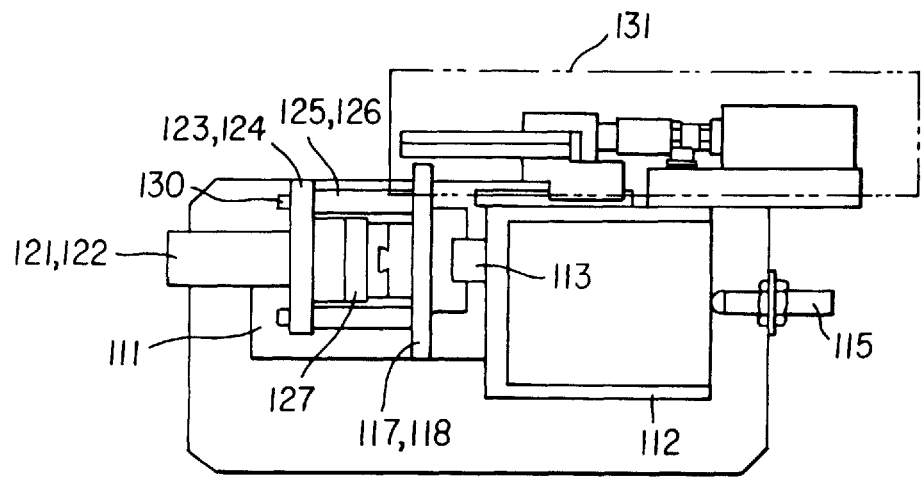
FIG. 8(a) is an expanded top plan view of the magnetic field application block for magnetic transfer of FIGS. 7(a) and 7(b)
Figure 8B:
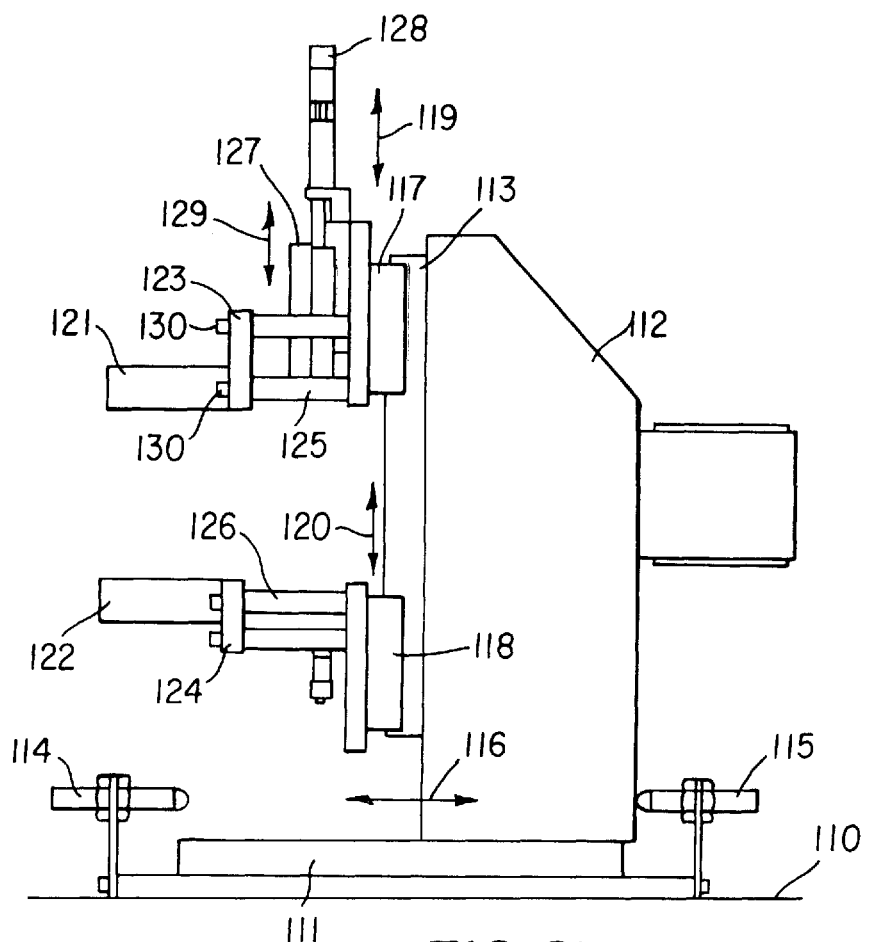
FIG. 8(b) is an expanded side plan view of the magnetic field application block for magnetic transfer of FIGS. 7(a) and 7(b)

Block 102 is a magnetic field application block for magnetic transfer according to the first embodiment of the invention. FIG. 8(a) is an expanded top plan view of the block 102, and FIG. 8(b) is an expanded side plan view of the block 102. The block 102 includes a base 112 mounted on the base 110 via a linear guide 111. Stoppers 114 and 115 are arranged on both sides of the linear guide 111. The stoppers 114 and 115 define the limits of the movement of the base 112 in the directions indicated by an arrow 116 during the initialization operation. A liner guide 113 is mounted on the base 112. Two vertical linear stages 117 and 118 are mounted on the liner guide 113 such that the vertical linear stages 117 and 118 are moveable vertically as indicated by arrows 119 and 120. Mounting plates 123 and 124 for mounting magnetic heads 121 and 122 are attached to the respective vertical linear stages 117 and 118 via respective fixing shafts 125 and 126. A uniaxial adjusting stage 127 is mounted on one of the vertical linear stages 117. The uniaxial adjusting stage 127 is fixed to the mounting plate 123. The fixing shafts 125 and the mounting plate 123 are released from the fixed state thereof by loosening attaching screws 130. Since the adjusting stage 127 is moved by a micrometer head 128 due to the structure described above when the attaching screws 130 are loosened, the magnetic head 121 is moveable such that the relative distance between the magnetic heads 121 and 122 is adjustable. It is not always necessary to provide the other vertical linear stage 118 with an adjusting stage. A link mechanism 131 is disposed on the other side of the apparatus to open or make the vertical linear stages come close to each other simultaneously. The magnetic heads are single-pole magnetic heads or ring heads.

Block 103 is a magnetic field application block that applies magnetic fields for conducting the initialization operation. Since the structure, the function and the behavior of the block 103 are the same with those of the block 102 except that the block 103 is a mirror image of the block 102 and that the magnetic heads are single-pole magnetic heads solely for initialization, detailed descriptions of the block 103 are omitted.

Block 104 is a master disc holding block. The block 104 includes an air chuck 132 for holding a master disc 106 as shown in FIG. 7(b); a stage 133 mounting the air chuck 132 thereon; a linear guide 134, that guides the air chuck 132 vertically to space apart the master disc 106 from the perpendicular magnetic recording medium; and an actuator 135 for driving the stage 133 along the linear guide 134. Although an air cylinder is used for the actuator 135 according to the embodiment, an oil-hydraulic cylinder and such a means well known to those skilled in the art may be used alternatively.

Figure 9A:
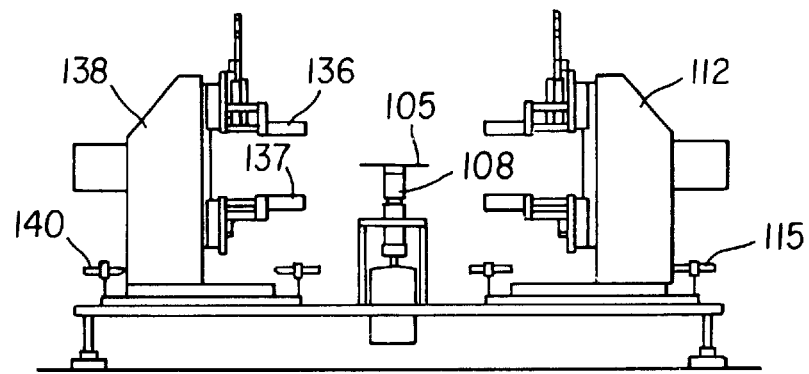
FIG. 9(a) is a side plan view of the magnetic transfer apparatus, to that a perpendicular magnetic recording medium is mounted for initialization.
Figure 9B:
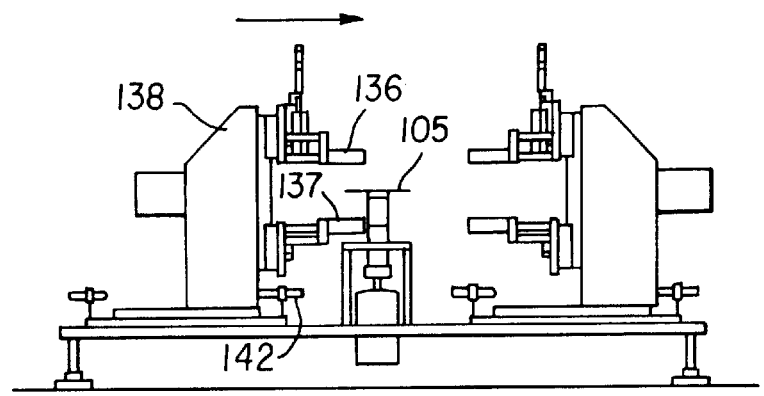
FIG. 9(b) is a side plan view of the magnetic transfer apparatus, in that the magnetic field application block for initialization is positioned in close proximity to the perpendicular magnetic recording medium.
Figure 9C:
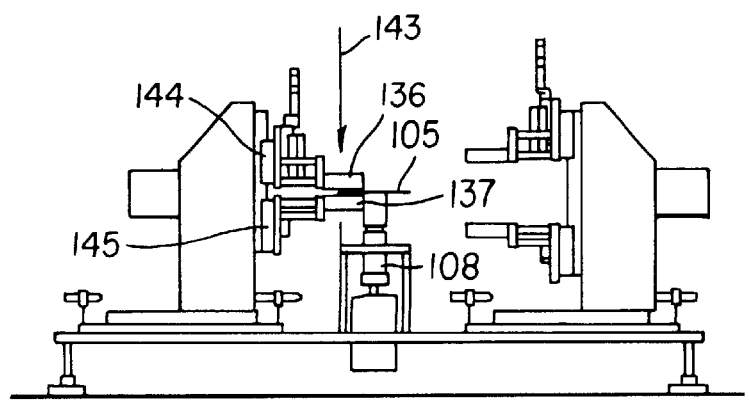
FIG. 9(c) is a side plan view of the magnetic transfer apparatus, in that the magnetic heads for initialization are positioned in close proximity to the perpendicular magnetic recording medium.
Figure 10A:
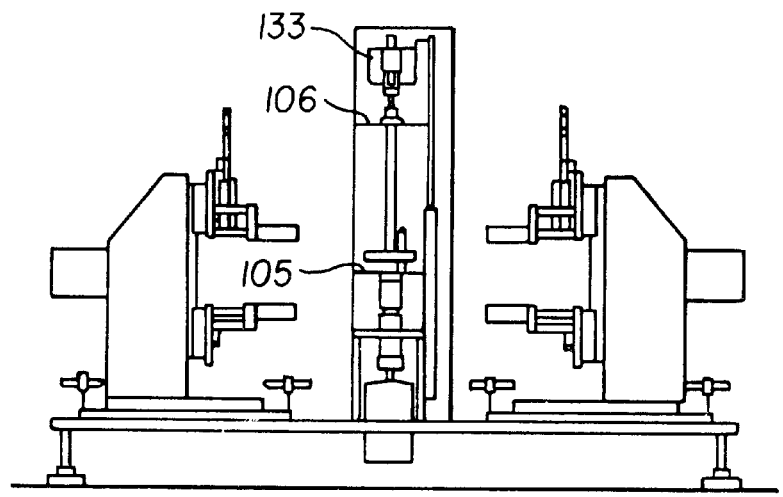
FIG. 10(a) is a side plan view of the magnetic transfer apparatus, to that an initialized perpendicular magnetic recording medium is mounted for magnetic transfer.
Figure 10B:
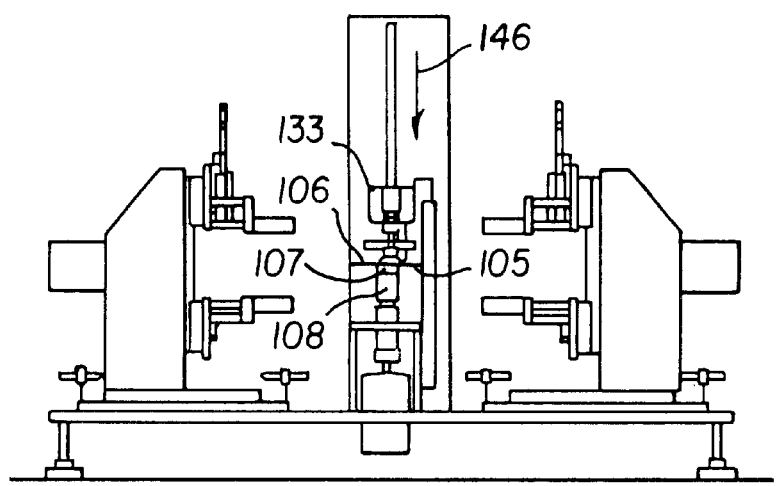
FIG. 10(b) is a side plan view of the magnetic transfer apparatus, in that a master disc for magnetic transfer is positioned in close proximity to the initialized perpendicular magnetic recording medium.
Figure 10C:
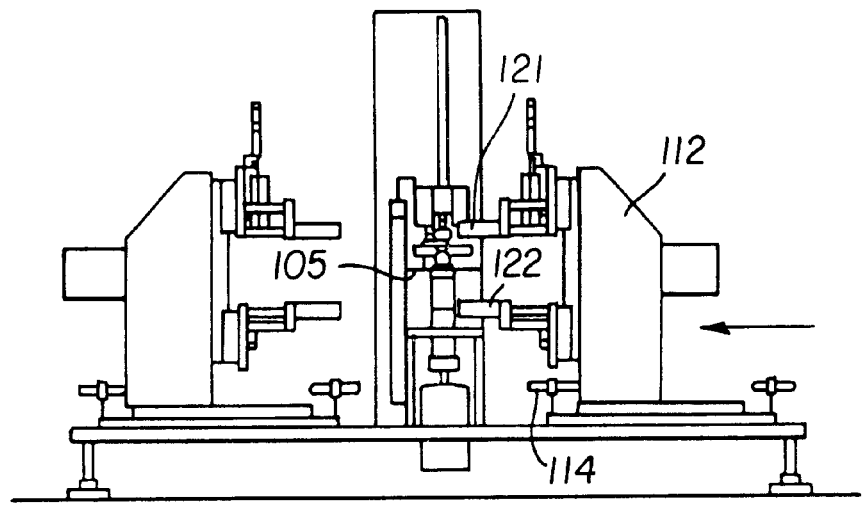
FIG. 10(c) is a side plan view of the magnetic transfer apparatus, in that the magnetic field application block for magnetic transfer is positioned in close proximity to the perpendicular magnetic recording medium.
Figure 10D:
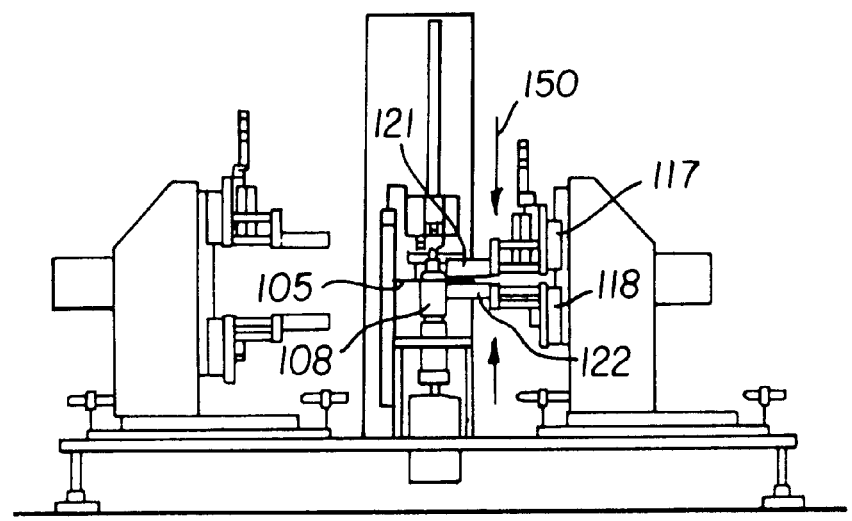
FIG. 10(d) is a side plan view of the magnetic transfer apparatus, in that the magnetic heads for magnetic transfer are positioned in close proximity to the perpendicular magnetic recording medium.

The series of the operations conducted by the magnetic transfer apparatus will now be described in connection with the practical initialization and magnetic transfer. FIG. 9(a) is a side plan view of the magnetic transfer apparatus, to that a perpendicular magnetic recording medium is mounted for initialization. FIG. 9(b) is a side plan view of the magnetic transfer apparatus, in that the magnetic field application block for initialization is positioned in close proximity to the perpendicular magnetic recording medium. FIG. 9(c) is a side plan view of the magnetic transfer apparatus, in that the magnetic heads for initialization are positioned in close proximity to the perpendicular magnetic recording medium. FIG. 10(a) is a side plan view of the magnetic transfer apparatus, to that an initialized perpendicular magnetic recording medium is mounted for magnetic transfer. FIG. 10(b) is a side plan view of the magnetic transfer apparatus, in that a master disc for magnetic transfer is positioned in close proximity to the initialized perpendicular magnetic recording medium. FIG. 10(c) is a side plan view of the magnetic transfer apparatus, in that the magnetic field application block for magnetic transfer according to the first embodiment is positioned in close proximity to the perpendicular magnetic recording medium. FIG. 10(d) is a side plan view of the magnetic transfer apparatus, in that the magnetic heads for magnetic transfer are positioned in close proximity to the perpendicular magnetic recording medium. In FIGS. 9(a) through 9(c), the block 104 not used for magnetic transfer is omitted for the sake of simplicity.

FIG. 9(a) shows the same state with that shown in FIG. 7(a). Referring now to FIG. 9(a), magnetic heads 136 and 137 are held keeping a vertical symmetry and a sufficient spacing between the perpendicular magnetic recording medium 105 such that the perpendicular magnetic recording medium 105 is not affected by the magnetic force. A base 138 of the magnetic field application block for initialization and the base 112 of the magnetic field application block for magnetic transfer according to the first embodiment are at the respective withdrawn positions, thereat the base 138 touches a stopper 140 and the base 112 touches the stopper 115, spaced apart widely from the spindle 108. The perpendicular magnetic recording medium 105 is attached to and detached from the spindle 108 while the base 138 for initialization and the base 112 for magnetic transfer are positioned as described above. In FIG. 9(a), the perpendicular magnetic recording medium 105 is on the spindle 108.

Referring now to FIG. 9(b), the base 138 for initialization is brought to the proximity of the perpendicular magnetic recording medium 105, until the base 138 touches a stopper 142. While the base 138 is approaching to the perpendicular magnetic recording medium 105, the magnetic heads 136 and 137 are spaced apart from each other so that the magnetic heads 136 and 137 may not affect the recording medium 105.

Referring now to FIG. 9(c), vertical linear stages 144 and 145 are made to come close in the direction indicated by an arrow 143 such that the magnetic heads 136 and 137 are positioned symmetrically with respect to the perpendicular magnetic recording medium 105 (in detail, with respect to the surface of the perpendicular magnetic recording medium 105, thereon the magnetic recording layer is formed, or with respect to the center plane between the major surfaces of the recording medium 105). Since the magnetic heads 136 and 137 move always keeping their symmetrical positional relationship, the anomaly due to the ascending and the descending of the magnetic heads is prevented from causing.

Since the magnetic heads 136 and 137 slowly close downward and upward respectively to the perpendicular magnetic recording medium 105, the recording medium 105 is affected by the turbulence of the magnetic field much less than by the conventional method, that inserts and draws out the recording medium 105 laterally into and from the space between the magnetic heads already made to come close. Thus, a magnetic field is applied to the perpendicular magnetic recording medium 105 more ideally. The spindle 108, chucking the perpendicular magnetic recording medium 105 between the magnetic heads made to come close to each other with their symmetrical positional relationship kept, is rotated one or more turns and the entire surface or surfaces of the perpendicular magnetic recording medium 105 are initialized. Since the magnetic heads 136 and 137 are arranged symmetrically with respect to the perpendicular magnetic recording medium 105, (1) the longitudinal expansion of the magnetic field is narrowed and (2) only the perpendicular component of the magnetic field is applied to the recording medium 105.

After initializing the perpendicular magnetic recording medium 105, the magnetic heads 136 and 137 are withdrawn from each other by the vertical linear stages 144 and 145. Thus, the magnetic heads 136 and 137 return to the state shown in FIG. 9(b). Since the magnetic heads 136 and 137 move keeping their symmetrical positional relationship while returning to the state shown in FIG. 9(b), the anomaly due to the ascending and descending of the magnetic heads is prevented from causing. Finally, the initialization operation is completed by returning the base 138 to the waiting position shown in FIG. 9(a).

The magnetic transfer operation will now be described. FIG. 10(a) shows the same state with those shown in FIGS. 7(a) and 9(a). Referring now to FIG. 10(a), the perpendicular magnetic recording medium 105 has been initialized already by the initialized operation described above with reference to FIGS. 9(a) through 9(c). Alternatively, the perpendicular magnetic recording medium 105 is a recording medium initialized by any of the other methods. At this stage, the position of the master disc is adjusted. The position of the master disc 106 is adjusted, for example, by observing a not shown marker marked at the center of the master disc 106 through a not shown CCD camera having a reference point and by making the marker coincide with the reference point. Since the reference point is positioned such that the reference point coincides with the center of the spindle 108 and since the perpendicular magnetic recording medium 105 is chucked onto the spindle 108, the positions of the master disc 106 and the recording medium 105 are adjusted.

Referring now to FIG. 10(b), the master disc 106 is lowered via the stage 133 to the direction indicated by an arrow 146 and made contact tightly with the perpendicular magnetic recording medium 105 by the air chuck 107.

Referring now to FIG. 10(c), the base 112 for magnetic transfer is made to come close to the perpendicular magnetic recording medium 105 until the base 112 touches the stopper 114. The base 112 is made to come close to the recording medium 105 with the magnetic heads 121 and 122 spaced apart from each other such that the magnetic heads 121 and 122 do not affect the recording medium 105.

Referring now to FIG. 10(d), the vertical linear stages 117 and 118 are made to come close in the direction indicated by an arrow 150 such that the magnetic heads 121 and 122 are always at the respective positions symmetrical with respect to the perpendicular magnetic recording medium 105 as a plane of symmetry. Since the moving magnetic heads 121 and 122 always keep their symmetrical positional relationship as describe above, the anomaly at the ascending and descending position of the magnetic heads is prevented from causing. Since the magnetic heads 121 and 122 are arranged symmetrically with respect to the perpendicular magnetic recording medium 105, only the perpendicular component of the magnetic field is applied to the perpendicular magnetic recording medium 105 when the magnetic heads are single-pole magnetic heads or only the parallel component of the magnetic field is applied to the perpendicular magnetic recording medium 105 when the magnetic heads are ring heads. Since the magnetic heads 121 and 122 slowly close downward and upward respectively to the perpendicular magnetic recording medium 105, the recording medium 105 is affected by the turbulence of the magnetic field much less than by the conventional method, that inserts and draws out the recording medium 105 laterally into and from the space between the magnetic heads already made to come close. Thus, a magnetic field is applied to the perpendicular magnetic recording medium 105 more ideally. The spindle 108, chucking the perpendicular magnetic recording medium 105 and the master disc 106 between the magnetic heads made to come close to each other with their symmetrical positional relationship kept, is rotated one or more turns and servo signals are transferred to the entire surface or surfaces of the perpendicular magnetic recording medium 105.

After transferring the servo data to the perpendicular magnetic recording medium 105, the magnetic heads 121 and 122 are withdrawn from each other by the vertical linear stages 117 and 118. Thus, the magnetic heads 121 and 122 return to the state shown in FIG. 10(c).

After withdrawing the base 112 to the waiting position shown in FIG. 10(b), the master disc 106 is raised via the stage 133 and withdrawn from the perpendicular magnetic recording medium 105. The magnetic transfer apparatus returns to the initial state shown in FIG. 10(a) and the magnetic transfer operation is completed.

Figure 11A:
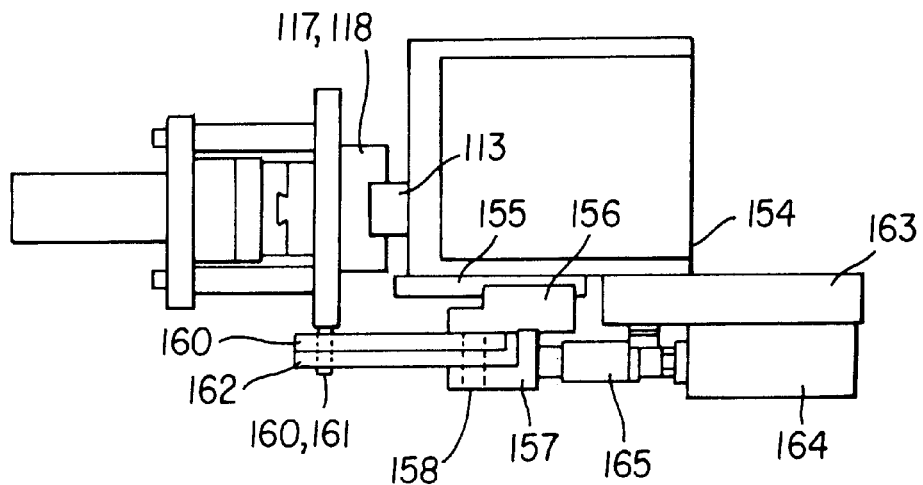
FIG. 11(a) is an expanded top plan view of a link mechanism of the magnetic transfer apparatus according to the invention.
Figure 11B:
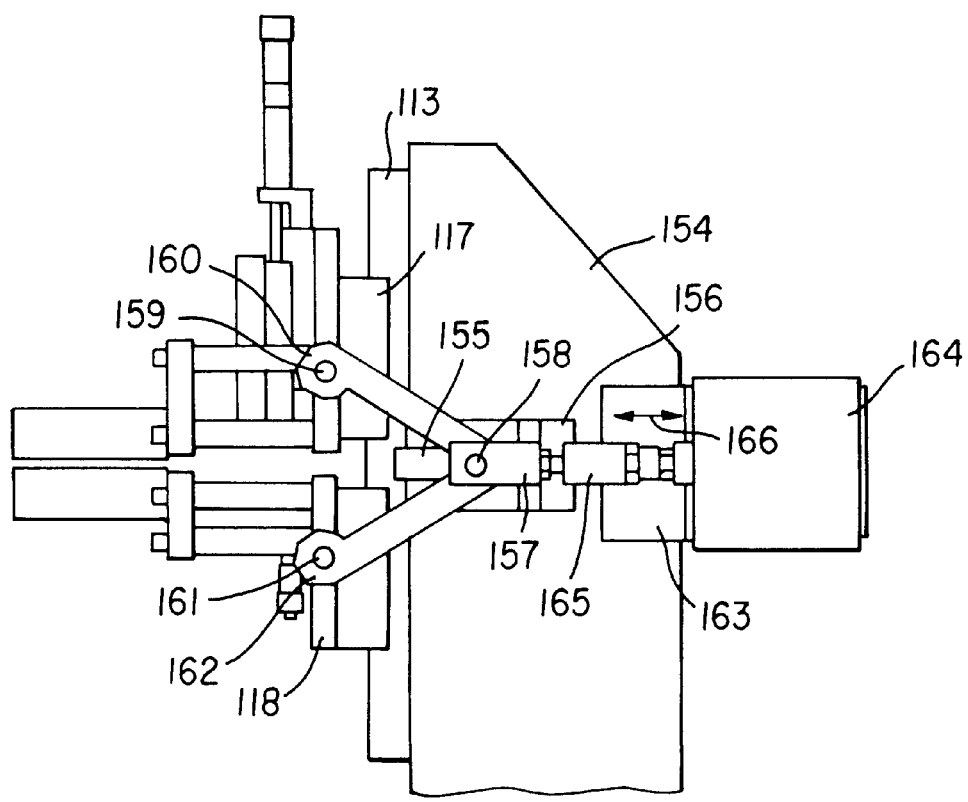
FIG. 11(b) is an expanded side plan view of the link mechanism of FIG. 11(a)

Now the mechanism for symmetrically transporting the magnetic heads will be described in detail. FIG. 11(a) is an expanded top plan view of the link mechanism 131 attached to the magnetic field application block for magnetic transfer. FIG. 11(b) is an expanded side plan view of the link mechanism 131 attached to the magnetic field application block for magnetic transfer according to the first embodiment.

Figure 12A:
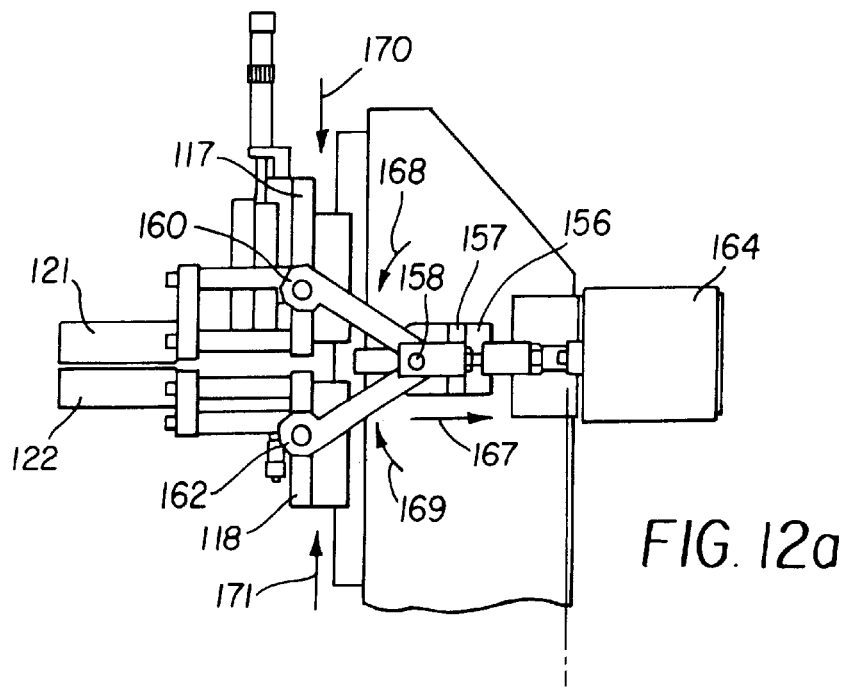
FIG. 12(a) is an expanded side plan view of a magnetic field application block for magnetic transfer according to the first embodiment of the invention showing the actuator pulling in the linear stage and the side plate.

Referring now to these figures, a horizontal linear guide 155 is attached to the base 112 of the magnetic field application block 102. A horizontal linear stage 156 is on the horizontal linear guide 155. A side plate 157 is disposed on the horizontal linear stage 156. A pin 158 is between the horizontal linear stage 156 and the side plate 157. Pins 159 and 161 are attached to the side walls of the vertical linear stages 117 and 118. An upper link 160 connects the pins 158 and 159 to each other. A lower link 162 connects the pins 158 and 161 to each other. An actuator 164 is attached to the base 112 via an attaching plate 163. The actuator 164 is coupled with the side plate 157 via a shaft coupling 165. Although an air cylinder is used for the actuator 164 according to the invention, an oil-hydraulic cylinder and such a means well known to those skilled in the art may be used alternatively. The actuator 164, capable of exerting driving force along the direction indicated by an arrow 166, moves the side plate 157 and the horizontal linear stage 156 along the linear guide 155 in the direction indicated by the arrow 166. FIG. 12(a) is an expanded side plan view of the magnetic field application block for magnetic transfer according to the first embodiment showing the actuator 164 pulling in the linear stage 156 and the side plate 157 to the direction indicated by an arrow 167. Since the pin 158 is moved to the direction indicated by the arrow 167 in association with the behavior of the actuator 164 described above, the upper link 160 rotates to the direction indicated by an arrow 168 and the lower link to the direction indicated by an arrow 169. By the rotational force of the lower links 160 and 162, the vertical linear stage 117 moves to the direction indicated by an arrow 170 and the vertical linear stage 118 to the direction indicated by an arrow 171.

Figure 12B:
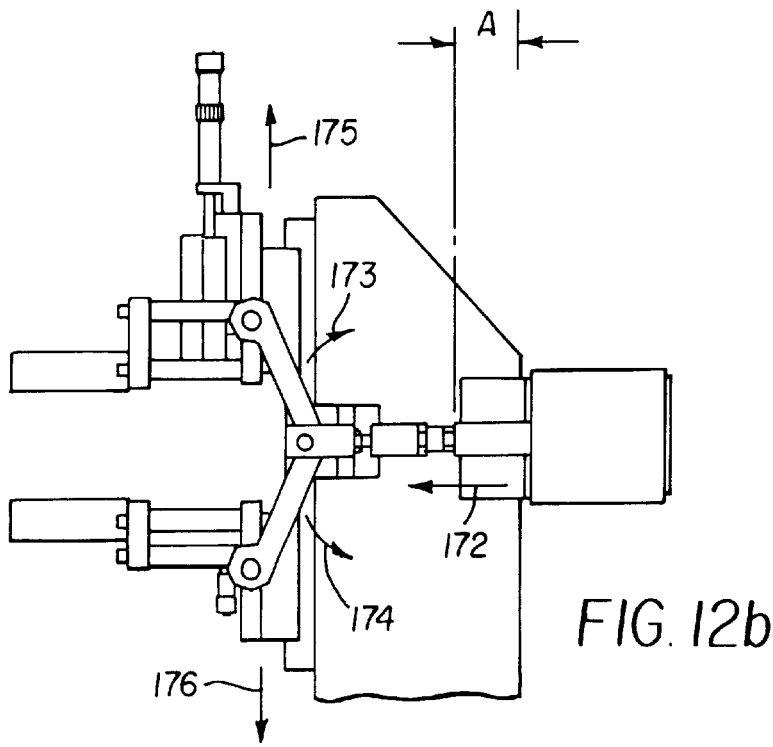
FIG. 12(b) is another expanded side plan view of the magnetic field application block for magnetic transfer according to the first embodiment showing the actuator pushing out the linear stage and the side plate.

Therefore, the magnetic heads 121 and 122 mounted on the vertical linear stages 117 and 118 move to the respective directions indicated by the arrows 170 and 171 while keeping their symmetrical positional relationship. Referring now to FIG. 12(b), the actuator 164 pushes the vertical linear stage 156 and the side plate 157 to the direction indicated by an arrow 172 for a distance A. Since the pin 158 moves to the direction indicated by an arrow 172 opposite to the direction indicated by the arrow 167 in FIG. 12(a), the upper link 160 rotates to the direction indicated by an arrow 173 and the lower link 162 to the direction indicated by an arrow 174. Receiving the rotational forces of the links 160 and 162, the vertical linear stage 117 moves to the direction indicated by an arrow 175 and the vertical linear stage 118 to the direction indicated by an arrow 176. Therefore, the magnetic head 121 mounted on the vertical linear stage 117 moves to the direction indicated by the arrow 175 and the magnetic head 122 mounted on the vertical linear stage 118 moves to the direction indicated by the arrow 176 while keeping their symmetrical positional relationship.

Figure 13A:
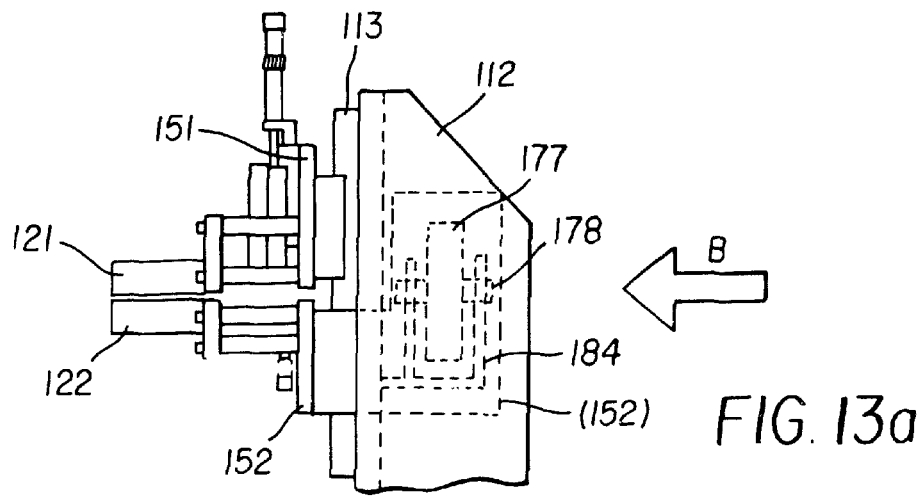
FIG. 13(a) is a side plan view of a magnetic field application block for magnetic transfer according to a second embodiment of the invention.

Now another mechanism according to a second embodiment of the invention for symmetrically transporting the magnetic heads will be described below in detail. FIG. 13(a) is a side plan view of a magnetic field application block for magnetic transfer according to a second embodiment of the invention. Referring now to FIG. 13(a), the magnetic field application block for magnetic transfer according to the second embodiment is different from the magnetic field application block for magnetic transfer according to the first embodiment in that the vertical linear stages 151 and 152 in the magnetic field application block according to the second embodiment are shaped with a letter L. One side of each L-shaped linear stage is attached to the linear guide 153 in the same way as in the magnetic field application block according to the first embodiment such that the L-shaped vertical linear stages 151 and 152 are guided vertically. The other side of each L-shaped vertical linear stage is protruding to the opposite side of the magnetic head 121 or 122. The portions of the L-shaped vertical linear stages 151 and 152 on the sides of the magnetic heads have the structure same with those in the magnetic field application block according to the first embodiment.

Figure 13B:
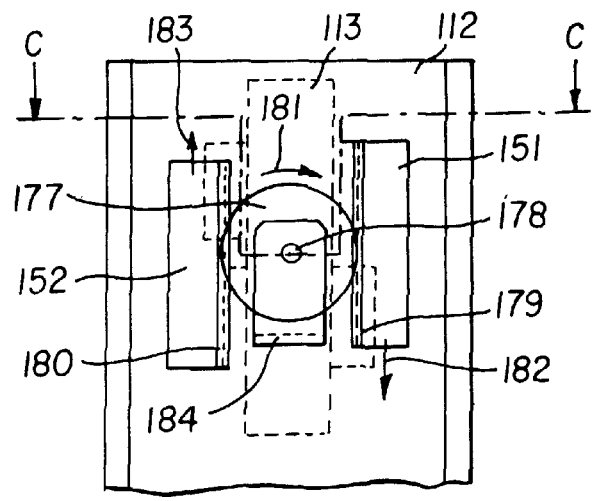
FIG. 13(b) is another side plan view of the magnetic field application block for magnetic transfer according to the second embodiment seen in the direction indicated by the arrow B in FIG. 13(a)
Figure 13C:
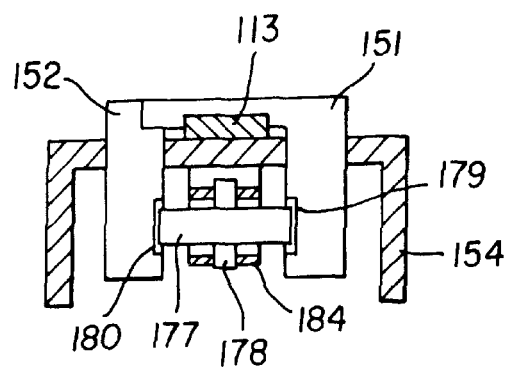
FIG. 13(c) is a cross section along C—C of FIG. 13(b)

FIG. 13(b) is another side plan view of the magnetic field application block for magnetic transfer according to the second embodiment seen in the direction indicated by the arrow B in FIG. 13(a). FIG. 13(c) is a cross section along C—C of FIG. 13(b). In FIGS. 13(b) and 13(c), the linear stages and the magnetic heads are omitted for the sake of simplicity. Referring now to these figures, a shaft bush 184 is arranged in a magnetic field application base 154. A pin 178 is inserted to the shaft bush 184 and connected to a not shown driving shaft. A pinion 177 is fixed to the pin 178. A rack 179 is disposed on one side of the vertical linear stage 151 and a rack 180 on one side of the vertical linear stage 152. The racks 179 and 180 couple with the pinion 177. In the magnetic field application block according to the second embodiment, the vertical linear stages 151 and 152 are moved with their symmetrical positional relationship always kept by rotating the pin 178 by the not shown actuator. When the pinion 177 is rotated in the direction indicated by an arrow 181 as shown in FIG. 13(b) by driving the pin 178, the pinion 177 exerts driving force downward to the linear stage 151 via the rack 179 and the linear stage 151 moves downward as indicated by an arrow 182. Since the pinion 177 exerts driving force upward to the linear stage 152 via the rack 180, the linear stage 152 moves upward as indicated by an arrow 183.

Now the method of adjusting the positions of the magnetic heads for initialization and for magnetic transfer will be described below. Since the adjusting method for initialization and the adjusting method for magnetic transfer are essentially the same with each other, the descriptions will be made in connection with the magnetic heads for magnetic transfer.

Figure 14A:
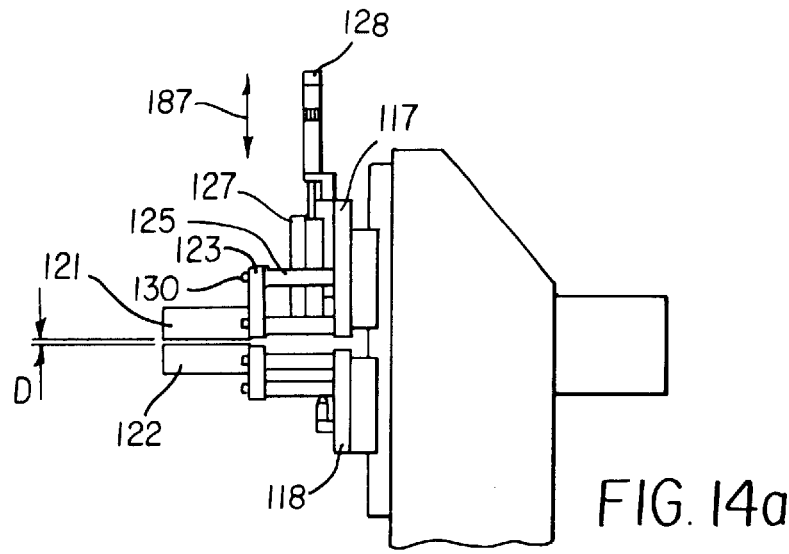
FIG. 14(a) is a side plan view showing the magnetic heads made to come close by the mechanism for symmetrically moving the magnetic heads.

FIG. 14(a) shows the magnetic heads 121 and 122 made to come close to each other. In the state shown in FIG. 14(a), the spacing D between the magnetic heads 121 and 122 is set such that the magnetic heads 121 and 122 are positioned symmetrically with respect to the perpendicular magnetic recording medium. Since large attractive force or large repulsive force is caused, as described earlier, between the magnetic heads 121 and 122 made to come close to each other, the adjusting stage 127, rigid enough to sustain the large attractive force or the large repulsive force, is inevitably large. To provide the mounting mechanism with sufficient rigidity, the vertical linear stage 117 and the mounting plate 123 are fixed by the fixing shafts 125 using the attaching screws 130. In other words, the attractive force or the repulsive force caused by the magnetic heads made to come close to each other is exerted through the mounting plate 123 and the fixing shafts 125 to the vertical linear stage 117 and sustained by the vertical linear stage 117. Since it is required for the adjusting stage 127 only to be rigid enough to sustain the weights of the mounting plate 123 and the magnetic head 121, it is possible to minimize the adjusting stage 127.

Figure 14B:
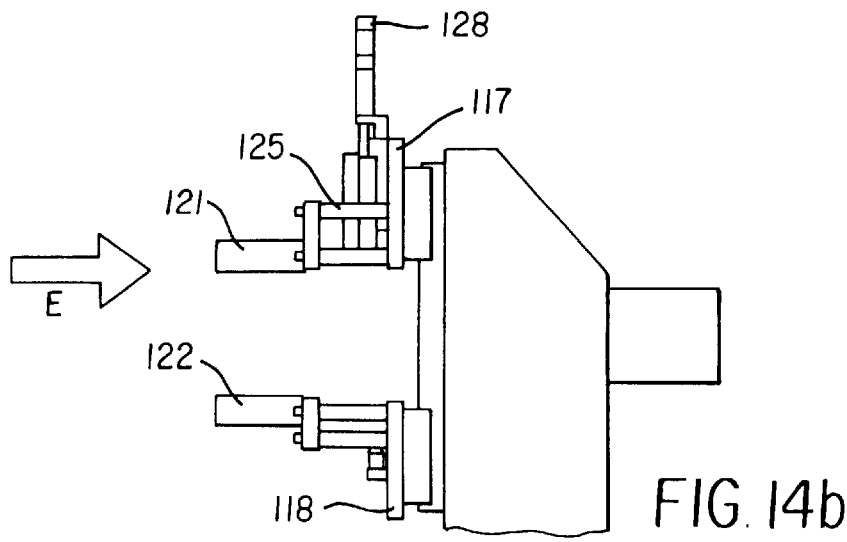
FIG. 14(b) is a side plan view showing the magnetic heads withdrawn by the mechanism for symmetrically moving the magnetic heads of FIG. 14(a)
Figure 14C:
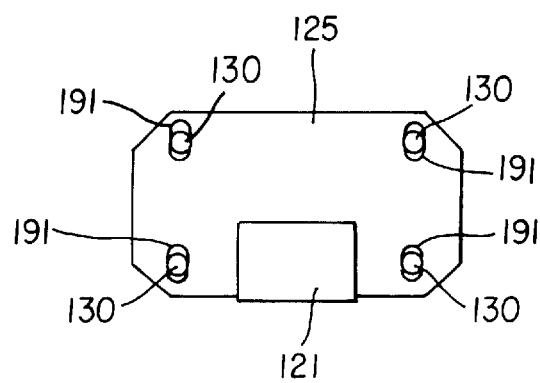
FIG. 14(c) is a side plan view seen in the direction indicated by the arrow E of FIG. 14(b)

FIG. 14(b) shows the magnetic heads 121 and 122 withdrawn from each other. The magnetic heads 121 and 122 are withdrawn from each other as shown in FIG. 14(b) for adjusting the spacing D so that attractive force or repulsive force may not be caused between the magnetic heads 121 and 122. FIG. 14(c) shows the magnetic head 121, the mounting plate 123 and four screws 130 corresponding to four fixing shafts seen in the direction indicated by the arrow E of FIG. 14(b). Then, the four screws 130 are loosened to release the mounting plate 123 and the linear stage 117 from the fixed state thereof. When the mounting plate 123 and the linear stage 117 are released from the fixed state thereof, it is possible to adjust the spacing D by moving the magnetic head 121, since the adjusting stage 127 is now moveable to the direction indicated by an arrow 187 by the micrometer head 128. Since long holes 191 are bored in the mounting plate 123, the position of the mounting plate 123, that is the position of the magnetic head 121, is adjustable by the length of the long holes. After the adjustment is over, the fixing shafts 125 for fixing the mounting plate 123 and the linear stage 117 are tightened by tightening the screws 130 to provide the mounting mechanism with sufficient rigidity. The spacing D between the magnetic heads 121 and 122 is adjusted as described above. By employing the structures and the means described above, the small adjusting stage facilitates adjusting the positions of the magnetic heads and the mounting mechanism for mounting the magnetic heads is rigid enough under the applied magnetic field.

The magnetic transfer apparatus according to the invention exhibits the following effects:

(1) the anomaly of drastically changing transferred signal intensity due to the ascending and the descending of the magnetic heads is prevented from causing in the portion of the magnetic recording medium corresponding to the ascending and the descending of the magnetic heads; and (2) an inexpensive and small adjusting mechanism for adjusting the positions of the magnetic heads and an inexpensive, small and very rigid mounting mechanism for mounting the magnetic heads are realized;

What is claimed is:

1. A magnetic transfer apparatus, for magnetically transferring servo data carried by a master disc to a perpendicular magnetic recording medium comprising a substrate and a magnetic recording layer on the substrate, the magnetic transfer apparatus comprising:

a positioning means for positioning the master disc in close proximity to or in tight contact with the perpendicular magnetic recording medium;

an adjusting means for adjusting the positions of the master disc and the perpendicular magnetic recording medium; and a first magnetic field application means for applying a magnetic field to magnetically transfer in a perpendicular direction to the master disc and the perpendicular magnetic recording medium positioned in close proximity to each other or in tight contact with each other, wherein the first magnetic field application means includes a pair of magnetic transfer heads that position symmetrically with respect to the surface of the perpendicular magnetic recording medium facing the master disc, and wherein the magnetic transfer heads move symmetrically with respect to the surface of the perpendicular magnetic recording medium facing the master disc in opposing directions from opposite sides of the magnetic recording medium.

2. The magnetic transfer apparatus according to claim 1, further comprising:

a second magnetic field application means for applying to the perpendicular magnetic recording medium a magnetic field for initializing the magnetization over the entire perpendicular magnetic recording medium, wherein the second magnetic field application means includes a pair of magnetic initializing heads that position symmetrically with respect to the surface of the perpendicular magnetic recording medium facing the master disc, and wherein the magnetic initializing heads move symmetrically with respect to the surface of the perpendicular magnetic recording medium facing the master disc in opposing directions from opposite sides of the magnetic recording medium.

3. A magnetic transfer apparatus for magnetically transferring servo data carried by a master disc to a perpendicular magnetic recording medium comprising a substrate and two magnetic recording layers on the major surfaces of the substrate, the magnetic transfer apparatus comprising:

a positioning means for positioning the master disc in close proximity to or in tight contact with the perpendicular magnetic recording medium;

an adjusting means for adjusting the positions of the master disc and the perpendicular magnetic recording medium; and a first magnetic field application means for applying a magnetic field to magnetically transfer in perpendicular direction to the master disc and the perpendicular magnetic recording medium positioned in close proximity to each other or in tight contact with each other, wherein the first magnetic field application means includes a pair of magnetic transfer heads that position symmetrically with respect to a center plane between the major surfaces of the perpendicular magnetic recording medium, and wherein the magnetic transfer heads move symmetrically with respect to the center plane in opposing directions from the center plane.

4. The magnetic transfer apparatus according to claim 3, further comprising:

a second magnetic field application means for applying to the perpendicular magnetic recording medium a magnetic field for initializing the magnetization over the entire perpendicular magnetic recording medium, wherein the second magnetic field application means includes a pair of magnetic initializing heads that position symmetrically with respect to the center plane, and wherein the magnetic initializing heads move symmetrically with respect to the center plane in opposing directions from the center plane.

5. The magnetic transfer apparatus according to claim 1, wherein the first magnetic field application means includes:

a horizontal linear stage that moves horizontally;

two vertical linear stages that move vertically;

two links connecting the horizontal linear stage and the vertical liner stages, wherein the magnetic transfer heads are mounted on the respective vertical linear stages; and an actuator that drives the horizontal linear stage to move the magnetic transfer heads symmetrically.

6. The magnetic transfer apparatus according to claim 3, wherein the first magnetic field application means includes:

a horizontal linear stage that moves horizontally;

two vertical linear stages that moves vertically;

two links connecting the horizontal linear stage and the vertical linear stages, wherein the magnetic transfer heads are mounted on the respective vertical linear stages; and an actuator for driving the horizontal linear stage to move the magnetic transfer heads symmetrically.

7. The magnetic transfer apparatus according to claim 1, wherein the first magnetic field application means includes:

a driving shaft;

a pinion on the drive shaft;

two racks coupled to the pinions, the racks being moved by the rotation of the pinion to the respective directions opposite to each other;

two vertical linear stages fixed to the respective racks, the vertical linear stages moving vertically, wherein the magnetic transfer heads are mounted on the respective vertical linear stages; and wherein the driving shaft rotates to move the magnetic transfer heads vertically and symmetrically.

8. The magnetic transfer apparatus according to claim 3, wherein the first magnetic field application means includes:

a driving shaft;

a pinion on the drive shaft;

two racks coupled to the pinions, the racks being moved by the rotation of the pinion to the respective directions opposite to each other;

two vertical liner stages fixed to the respective racks, the vertical linear stages moving vertically, wherein the magnetic transfer heads are mounted on the respective vertical linear stages; and wherein the driving shaft rotates to move the magnetic transfer heads vertically and symmetrically.

9. The magnetic transfer apparatus according to claim 1, wherein the first magnetic field application means includes:

a first linear stage; and a second linear stage, wherein the first linear stage and the second linear stage symmetrically move the magnetic transfer heads, wherein the first linear stage comprises an adjusting stage mounting one of the magnetic transfer heads, and a fixing means, wherein the other one of the magnetic transfer heads is mounted on the second linear stage, wherein the one of the magnetic transfer heads is released from the fixing thereof to the first linear stage to adjust the positions of the magnetic transfer heads, and wherein the fixing means fixes the one of the magnetic transfer heads to the first linear stage to apply a magnetic field to the perpendicular magnetic recording medium.

10. The magnetic transfer apparatus according to claim 3, wherein the first magnetic field application means includes:

a first linear stage; and a second linear stage, wherein the first linear stage and the second linear stage symmetrically move the magnetic transfer heads, wherein the first linear stage comprises an adjusting stage mounting one of the magnetic transfer heads, and a fixing means, wherein the other one of the magnetic transfer heads is mounted on the second linear stage, wherein the one of the magnetic transfer heads is released from the fixing thereof to the first linear stage to adjust the positions of the magnetic transfer heads, and wherein the fixing means fixes the one of the magnetic transfer heads to the first linear stage to apply a magnetic field to the perpendicular magnetic recording medium.

11. The magnetic transfer apparatus according to claim 2, wherein the first magnetic field application means and the second magnetic field application means comprises the same structure.

12. The magnetic transfer apparatus according to claim 4, wherein the first magnetic field application means and the second magnetic field application means comprises the same structure.

13. The magnetic transfer apparatus according to claim 1, wherein each of the magnetic transfer heads comprises a single-pole magnetic head.

14. The magnetic transfer apparatus according to claim 3, wherein each of the magnetic transfer heads comprises a single-pole magnetic head.

15. The magnetic transfer apparatus according to claim 1, wherein each of the magnetic transfer heads comprises a ring head.

16. The magnetic transfer apparatus according to claim 3, wherein each of the magnetic transfer heads comprises a ring head.

17. The magnetic transfer apparatus according to claim 2, wherein each of the magnetic initializing heads comprises a single-pole magnetic head.

18. The magnetic transfer apparatus according to claim 4, wherein each of the magnetic initializing heads comprises a single-pole magnetic head.

19. The magnetic transfer apparatus according to claim 1, wherein the master disc comprises a nonmagnetic substrate comprising soft magnetic layers, the soft magnetic layers being arranged in stripe-shaped ranges patterned or embedded periodically in the surface portion of the nonmagnetic substrate corresponding to the servo data.

20. The magnetic transfer apparatus according to claim 3, wherein the master disc comprises a nonmagnetic substrate comprising soft magnetic layers, the soft magnetic layers being arranged in stripe-shaped ranges patterned or embedded periodically in the surface portion of the nonmagnetic substrate corresponding to the servo data.

21. A method of magnetically transferring servo data carried by a master disc to a perpendicular magnetic recording medium comprising a substrate and a magnetic recording layer on one of the major surfaces of the substrate, the method comprising the steps of:

positioning the master disc in close proximity to or in tight contact with the perpendicular magnetic recording medium;

positioning a pair of magnetic transfer heads in a symmetrical positional relationship with respect to the surface of the perpendicular magnetic recording medium facing the master disc;

moving the magnetic transfer heads close to the perpendicular magnetic recording medium in opposite directions perpendicular to the surface of the magnetic recording medium while keeping the symmetrical positional relationship with respect to the surface of the perpendicular magnetic recording medium facing the master disc;

applying a magnetic field to the perpendicular magnetic recording medium from the magnetic transfer heads to transfer the servo data from the master disc to the perpendicular magnetic recording medium in a perpendicular direction with respect to the surface of the magnetic recording medium; and moving the magnetic transfer heads away from the perpendicular magnetic recording medium in the opposite directions perpendicular to the surface of the magnetic recording medium while keeping the symmetrical positional relationship with respect to the surface of the perpendicular magnetic recording medium facing the master disc.

22. The method according to claim 21, further comprising the steps of:

positioning a pair of magnetic initializing heads in a symmetrical positional relationship with respect to the surface of the perpendicular magnetic recording medium facing the master disc;

moving the magnetic initializing heads close to the perpendicular magnetic recording medium in the opposite directions perpendicular to the surface of the magnetic recording medium while keeping the symmetrical positional relationship with respect to the surface of the perpendicular magnetic recording medium facing the master disc;

applying a magnetic field to the perpendicular magnetic recording medium from the magnetic initializing heads to initialize the perpendicular magnetic recording medium; and moving the magnetic initializing heads away from the perpendicular magnetic recording medium in the opposite directions perpendicular to the surface of the magnetic recording medium while keeping the symmetrical positional relationship with respect to the surface of the perpendicular magnetic recording medium facing the master disc.

23. A method of magnetically transferring servo data carried by a master disc to a perpendicular magnetic recording medium comprising a substrate and two magnetic recording layer on both major surfaces of the substrate, the method comprising the steps of:

positioning the master disc in close proximity to or in tight contact with the perpendicular magnetic recording medium;

positioning a pair of magnetic transfer heads in a symmetrical positional relationship with respect to the center plane between the major surfaces of the perpendicular magnetic recording medium;

moving the magnetic transfer heads close to the perpendicular magnetic recording medium in opposite directions perpendicular to the center plane while keeping the symmetrical positional relationship with respect to the center plane;

applying a magnetic field to the perpendicular magnetic recording medium from the magnetic transfer heads to transfer the servo data from the master disc to the perpendicular magnetic recording medium in a perpendicular direction with respect to the center plane; and moving the magnetic transfer heads away from the perpendicular magnetic recording medium in the opposite directions perpendicular to the center plane while keeping the symmetrical positional relationship with respect to the center plane.

24. The method according to claim 23, further comprising the steps of:

positioning a pair of magnetic initializing heads in a symmetrical positional relationship with respect to the center plane;

moving the magnetic initializing heads close to the perpendicular magnetic recording medium in the opposite directions perpendicular to the center plane while keeping the symmetrical positional relationship with respect to the center plane;

applying a magnetic field to the perpendicular magnetic recording medium from the magnetic initializing heads to initialize the perpendicular magnetic recording medium; and moving the magnetic initializing heads away from the perpendicular magnetic recording medium in the opposite directions perpendicular to the center plane while keeping the symmetrical positional relationship with respect to the center plane.

25. The method according to claim 21, wherein the pair of the magnetic transfer heads comprises a pair of single-pole magnetic heads, a pole of a first polarity of one of the single-pole magnetic heads facing a pole of a second polarity of the other one of the single-pole magnetic heads.

26. The method according to claim 23, wherein the pair of the magnetic transfer heads comprises a pair of single-pole magnetic heads, a pole of a first polarity of one of the single-pole magnetic beads facing a pole of a second polarity of the other one of the single-pole magnetic heads.

27. The method according to claim 21, wherein the pair of the magnetic transfer heads comprises a pair of ring heads, the poles of the same polarity of the ring heads facing each other.

28. The method according to claim 23, wherein the pair of the magnetic transfer heads comprises a pair of ring heads, the poles of the same polarity of the ring heads facing each other.

* * * * *